US011405797B2

(12) United States Patent
Vaidya et al.

(10) Patent No.: US 11,405,797 B2
(45) Date of Patent: Aug. 2, 2022

(54) APPARATUS AND METHODS FOR CELL ACTIVATION IN WIRELESS NETWORKS

(71) Applicant: Charter Communications Operating, LLC, St. Louis, MO (US)

(72) Inventors: Maulik Vaidya, Escondido, CA (US); Curt Wong, Bellevue, WA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 22 days.

(21) Appl. No.: 15/945,657

(22) Filed: Apr. 4, 2018

(65) Prior Publication Data

US 2019/0289470 A1    Sep. 19, 2019

Related U.S. Application Data

(60) Provisional application No. 62/645,074, filed on Mar. 19, 2018.

(51) Int. Cl.
*H04W 16/18*    (2009.01)
*H04W 16/14*    (2009.01)
*H04W 24/02*    (2009.01)

(52) U.S. Cl.
CPC ........... *H04W 16/18* (2013.01); *H04W 16/14* (2013.01); *H04W 24/02* (2013.01)

(58) Field of Classification Search
CPC ..... H04W 16/18; H04W 16/14; H04W 24/02; H04W 16/28; H04W 72/046; H04W 76/30; H04L 5/0048
See application file for complete search history.

(56) References Cited

U.S. PATENT DOCUMENTS 6,542,739 B1   4/2003  Garner
8,265,028 B2   9/2012  Davies et al.
(Continued)

FOREIGN PATENT DOCUMENTS

CA    3097140 A1    10/2019
CN    105071860 A   11/2015
(Continued)

OTHER PUBLICATIONS

3GPP TS 38.473 v15.0.0 (Dec. 2017); 3rd Generation Partnership Project; Technical Specification Group Radio Access Network; NG-RAN; F1 applicatoin protocol (F1AP) (Release 15). (Year: 2017).*

(Continued)

*Primary Examiner* — Marcus Hammonds
(74) *Attorney, Agent, or Firm* — Gazdzinski & Associates, PC

(57) ABSTRACT

Apparatus and methods for streamlined cell activation in a wireless network. In one embodiment, the apparatus and methods provide enhanced wireless services which utilize bandwidth-efficient setup/configuration messaging and cell activation, including for very large numbers of cells, and which do not overwhelm data backhaul(s) associated with wireless nodes used for communication. In one embodiment, a message protocol is used wherein a prescribed number of cells of a given DU (e.g., all, a prescribed subset, etc.) are activated without having to enumerate or include specific data relating to the cells being activated. In one variant, this "global" activation is conducted using an Activate All Cells IE (Information Element) disposed with the F1SETUP RESPONSE message issued by a controlling CU entity within a 5G-NR infrastructure. In other variants, cells of multiple DUs can be controlled simultaneously, such as via distribution of a system-wide global activation IE.

20 Claims, 17 Drawing Sheets

(56) References Cited

U.S. PATENT DOCUMENTS

| | | | |
|---|---|---|---|
| 8,599,797 | B2 | 12/2013 | Pelkonen |
| 8,724,588 | B2 | 5/2014 | Li et al. |
| 8,880,071 | B2 | 11/2014 | Taaghol et al. |
| 8,997,136 | B2 | 3/2015 | Brooks et al. |
| 9,001,789 | B2 | 4/2015 | Hosobe |
| 9,209,898 | B1 | 12/2015 | Schemmann et al. |
| 9,596,593 | B2 | 3/2017 | Li |
| 9,706,512 | B2 | 7/2017 | Suh |
| 9,948,349 | B2 | 4/2018 | Malach |
| 10,009,431 | B2 | 6/2018 | Holtmanns |
| 10,375,629 | B2 | 8/2019 | Zhang |
| 10,506,499 | B2 | 12/2019 | Keller et al. |
| 11,129,213 | B2 | 9/2021 | Maulik |
| 2008/0101291 | A1 | 5/2008 | Jiang et al. |
| 2009/0176490 | A1 | 7/2009 | Kazmi et al. |
| 2010/0008235 | A1 | 1/2010 | Tinnakornsrisuphap et al. |
| 2010/0178912 | A1 | 7/2010 | Gunnarsson et al. |
| 2011/0117917 | A1 | 5/2011 | Gresset et al. |
| 2011/0207456 | A1 | 8/2011 | Radulescu et al. |
| 2012/0224563 | A1 | 9/2012 | Zisimopoulos et al. |
| 2012/0246255 | A1 | 9/2012 | Walker et al. |
| 2012/0275315 | A1 | 11/2012 | Schlangen et al. |
| 2013/0178225 | A1 | 7/2013 | Xing |
| 2013/0252616 | A1 | 9/2013 | Murakami |
| 2014/0370895 | A1 | 12/2014 | Pandey et al. |
| 2015/0156777 | A1 | 6/2015 | Negus et al. |
| 2015/0201088 | A1 | 7/2015 | Wu et al. |
| 2015/0365178 | A1 | 12/2015 | Maattanen et al. |
| 2016/0013855 | A1 | 1/2016 | Campos et al. |
| 2016/0073344 | A1 | 3/2016 | Vutukuri et al. |
| 2016/0128072 | A1 | 5/2016 | Rajagopal et al. |
| 2016/0212632 | A1 | 7/2016 | Katamreddy et al. |
| 2016/0373974 | A1 | 12/2016 | Gomes et al. |
| 2017/0019144 | A1 | 1/2017 | Malach |
| 2017/0201912 | A1 | 7/2017 | Zingler et al. |
| 2017/0208488 | A1 | 7/2017 | Hwang et al. |
| 2017/0245281 | A1 | 8/2017 | Zuckerman et al. |
| 2018/0063813 | A1 | 3/2018 | Gupta et al. |
| 2018/0092142 | A1 | 3/2018 | Han et al. |
| 2018/0098245 | A1 | 4/2018 | Livanos et al. |
| 2018/0184337 | A1 | 6/2018 | Jin et al. |
| 2018/0213452 | A1 | 7/2018 | Kim et al. |
| 2018/0338277 | A1* | 11/2018 | Byun ................ H04W 74/0833 |
| 2019/0007870 | A1 | 1/2019 | Gupta et al. |
| 2019/0053193 | A1* | 2/2019 | Park ................ H04W 56/0005 |
| 2019/0075023 | A1* | 3/2019 | Sirotkin ................ H04L 41/082 |
| 2019/0082501 | A1 | 3/2019 | Vesely et al. |
| 2019/0208380 | A1 | 7/2019 | Shi et al. |
| 2019/0229974 | A1 | 7/2019 | Campos et al. |
| 2019/0245740 | A1* | 8/2019 | Kachhla ................ G06F 8/65 |
| 2019/0253944 | A1 | 8/2019 | Kim |
| 2019/0320322 | A1 | 10/2019 | Jayawardene et al. |
| 2019/0320494 | A1 | 10/2019 | Jayawardene |
| 2019/0357199 | A1 | 11/2019 | Ali et al. |
| 2020/0053545 | A1 | 2/2020 | Wong et al. |
| 2021/0314762 | A1 | 10/2021 | Wong et al. |
| 2022/0007440 | A1 | 1/2022 | Vaidya et al. |

FOREIGN PATENT DOCUMENTS

| | | |
|---|---|---|
| CN | 111989900 A | 11/2020 |
| EP | 3782341 A1 | 2/2021 |
| EP | 3782435 A1 | 2/2021 |
| JP | 2007281617 A | 10/2007 |
| JP | 2010136020 A | 6/2010 |
| JP | 2011254495 A | 12/2011 |
| JP | 2016511998 A | 4/2016 |
| JP | 2017118483 A | 6/2017 |
| JP | 2018023050 A | 2/2018 |
| JP | 2018150589 A | 4/2018 |
| JP | 2021521712 A | 8/2021 |
| KR | 20160097917 A | 8/2016 |
| WO | WO-2004045125 A2 | 5/2004 |
| WO | WO-2017186294 A1 | 11/2017 |
| WO | WO-2018131488 A1 | 7/2018 |
| WO | WO-2019204166 A1 | 10/2019 |
| WO | WO-2019204165 A1 | 10/2019 |
| WO | WO-2020033334 A1 | 2/2020 |
| WO | WO-2020077346 A1 | 4/2020 |
| WO | WO-2020081471 A1 | 4/2020 |

OTHER PUBLICATIONS

Campos, et al., U.S. Appl. No. 62/620,615, filed Jan. 23, 2018 related to publication US20190229974A1. (Year: 2018).

Maamoun K. M. et al., "A Survey and a Novel Scheme for RoF-PON as FTTx Wireless Services," 2009 6th InternationalSymposium on High Capacity Optical Networks and EnablingTechnologies(HONET), IEEE, 2009, pp. 246-253.

* cited by examiner

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString SIZE(1..150,...) | | YES | ignore |
| Supported TAs | | 1..<maxnoofTACs> | | Supported TAs in the eNB. | GLOBAL | reject |
| >TAC | M | | 9.2.3.7 | Broadcast TAC. | | |
| >Broadcast PLMNs | | 1..<maxnoofBPLMNs> | | Broadcast PLMNs. | | |
| >>PLMN Identity | M | | 9.2.3.8 | | | |
| >RAT-Type | O | | 9.2.1.117 | RAT-Type associated with the TAC of the indicated PLMN(s). | YES | reject |
| Default Paging DRX | M | | 9.2.1.16 | | YES | ignore |
| CSG Id List | | 0..1 | | | GLOBAL | reject |
| >CSG Id | | 1..<maxnoofCSGIds> | 9.2.1.62 | | | |
| UE Retention Information | O | | 9.2.1.112 | | YES | ignore |
| NB-IoT Default Paging DRX | O | | 9.2.1.114 | | YES | ignore |

| Range bound | Explanation |
|---|---|
| maxnoofTACs | Maximum no. of TACs. Value is 256. |
| maxnoofBPLMNs | Maximum no. of Broadcast PLMNs. Value is 6. |
| maxnoofCSGIds | Maximum no. of CSG Ids within the CSG Id List. Value is 256. |

FIG. 1 (Prior Art)

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME Name | O | | PrintableString(SIZE(1..150,...)) | | YES | ignore |
| Served GUMMEIs | | 1..<maxnoofRATs> | | The LTE related pool configuration is included on the first place in the list. | GLOBAL | reject |
| >Served PLMNs | M | 1..<maxnoofPLMNsPerMME> | | | | |
| >>PLMN Identity | M | | 9.2.3.8 | | | |
| >Served GroupIDs | M | 1..<maxnoofGroupIDs> | | | | |
| >>MME Group ID | M | | OCTET STRING (SIZE(2)) | | | |
| >Served MMECs | M | 1..<maxnoofMMECs> | | | | |
| >>MME Code | M | | 9.2.3.12 | | | |
| Relative MME Capacity | M | | 9.2.3.17 | | YES | ignore |
| MME Relay Support Indicator | O | | 9.2.1.82 | | YES | ignore |
| Criticality Diagnostics | O | | 9.2.1.21 | | YES | ignore |
| UE Retention Information | O | | 9.2.1.112 | | YES | ignore |
| Served DCNs | | 0..<maxnoofDCNs> | | | GLOBAL | ignore |
| >Served DCNs Items | M | | 9.2.1.121 | | | |

| Range bound | Explanation |
|---|---|
| maxnoofPLMNsPerMME | Maximum no. of PLMNs per MME. Value is 32. |
| maxnoofRATs | Maximum no. of RATs. Value is 8. |
| maxnoofGroupIDs | Maximum no. of GroupIDs per node per RAT. Value is 65535. |
| maxnoofMMECs | Maximum no. of MMECs per node per RAT. Value is 256. |
| maxnoofDCNs | Maximum no. of DCNs serverved by one MME. Value is 32. |

FIG. 2 (Prior Art)

| IE/Group Name | Presence | Range | IE type and reference | Semantics description | Criticality | Assigned Criticality |
|---|---|---|---|---|---|---|
| NR CGI | M | | 9.3.1.12 | | - | - |
| NR PCI | M | | INTEGER (0..1007) | Physical Cell ID | | |

| IE/Group Name | Presence | Range | IE type and reference | Semantics description |
|---|---|---|---|---|
| PLMN Identity | M | | 9.3.1.14 | |
| NR Cell Identity | M | | BIT STRING (36) | |

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB ID (FFS) | M | | | | | |
| Activate All Cells | | | | Activate all cells included in F1 SETUP REQUEST | | |
| Cells to be Activated List | | 0..1 | | | | |
| >Cells to be Activated List Item | | 1..<maxCellingNBDU> | | List of cells to be activated | YES | reject |
| >>NR Cell ID | M | | FFS | NR cell identifier (FFS) | , | , |
| >>gNB-CU System Information | M | | | RRC container with system information owned by gNB-CU | , | , |
| >>Broadcast PLMN (FFS) | | | | | | |
| >>TAI (FFS) | | | | | | |

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB ID (FFS) | M | | | | | |
| Activate All Cells-1 | | 1 | | Activate all cells with NCI included in <maxCellingNBDU> | | |
| Activate All Cells-n | | 1 | | Activate all cells with NCI included in [<maxCellingNBDU> + 2"] | | |
| Cells to be Activated List | | 0..1 | | | | |
| >Cells to be Activated List Item | | 1.. <maxCellingNBDU> | | List of cells to be activated | YES | reject |
| >>NR Cell ID | M | | FFS | NR cell identifier (FFS) | | |
| >>gNB-CU System Information | M | | | RRC container with system information owned by gNB-CU | | |
| >>Broadcast PLMN (FFS) | | | | | | |
| >>TAI (FFS) | | | | | | |

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB ID (FFS) | M | | | | | |
| Activate All Cells-U | | 1 | | Activate all cells of target DU (unconditional) | | |
| Cells to be Activated List | | 0..1 | | | YES | reject |
| >Cells to be Activated List Item | | 1..<maxCellingNBDU> | | List of cells to be activated | | |
| >>NR Cell ID | M | | FFS | NR cell identifier (FFS) | | |
| >>gNB-CU System Information | M | | | RRC container with system information owned by gNB-CU | | |
| >>Broadcast PLMN (FFS) | | | | | | |
| >TAI (FFS) | | | | | | |

APPARATUS AND METHODS FOR CELL ACTIVATION IN WIRELESS NETWORKS

PRIORITY

This application claims priority to U.S. Provisional Patent application Ser. No. 62/645,074 filed Mar. 19, 2018 and entitled "APPARATUS AND METHODS FOR CELL ACTIVATION IN WIRELESS NETWORKS," which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to activation or selection of one or more cells within one or more RANs (Radio Area Networks) of a radio network utilizing licensed and/or unlicensed spectrum.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/ HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |

TABLE 2-continued

| Frequency range | Type | Center frequency | Availability | Licensed users |
|---|---|---|---|---|
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

5G New Radio (NR) and NG-RAN (Next Generation Radio Area Network) NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

As described in TS 36.413, per Section 9.1.8.4, the S1 SETUP REQUEST message is sent by the eNB to the target MME transfer information for a TNL association. See FIG. 1 herein. Per Section 9.1.8.5 of TS 36.413, the S1 SETUP RESPONSE message is sent by the MME to the transmitting eNB to transfer information for a TNL association. See FIG. 2 herein.

In the LTE/LTE-A standards, an eNB can support up to and including 256 cells. So, including the identities of all the supported cells in an S1 SETUP REQUEST message is rather trivial.

However, unlike LTE, NR/NG-RAN is by design capable of hosting cells numbering orders of magnitude larger than LTE. Specifically, it has been agreed by the 3GPP RAN3 Working Group that the NR Cell Identity (NCI) parameter, which identifies a particular cell in a given network, can be up to and including 36-bits in length. The NCI parameter is composed to two parts: (i) an gNB-ID value (identifier of the gNB itself), and (ii) a Cell Identity (identifier of a given cell). Furthermore, at RAN3 #97bis ("Draft Report from the RAN WG3 #97bis Meeting", Prague, Czech Republic, 9th-13th October 2017, v 1.0b, incorporated herein by reference in its entirety), the working assumption of gNB-ID minimum length of 22-bits, and a maximum length being 32-bits, was utilized. Accordingly, the number of supported cells in an NG-RAN can be extremely high, e.g., up to $2^{14}$ (based on a maximum bit size of the NCI of 36 (as noted above), of which a minimum of 22 bits are required for gNB-ID—this allows for a maximum of 36−22=14 bits for cell identifiers, or 2^14 possible values).

Similar to the above-described S1 SETUP procedure, when the NG-RAN employs a "split" architecture—where gNB/ngeNB is split into (i) a CU (central or centralized unit) and (ii) a DU (distributed or disaggregated unit)—an F1 SETUP interface setup procedure is used.

As a brief aside, and referring to FIG. 3, the CU 304 (also known as gNB-CU) is a logical node within the NR architecture 300 that communicates with the NG Core 303, and includes gNB functions such as transfer of user data, session management, mobility control, RAN sharing, and positioning; however, other functions are allocated exclusively to the DU(s) 306 (also known as gNB-DUs) per various "split" options described subsequently herein in greater detail. The CU 304 communicates user data and controls the operation of the DU(s) 306, via corresponding front-haul (Fs) user plane and control plane interfaces 308, 310.

Accordingly, to implement the Fs interfaces 308, 310, the (standardized) F1 interface is employed. It provides a mechanism for interconnecting a gNB-CU 304 and a gNB-DU 306 of a gNB 302 within an NG-RAN, or for interconnecting a gNB-CU and a gNB-DU of an en-gNB within an E-UTRAN. The F1 Application Protocol (F1AP) supports the functions of F1 interface by signalling procedures defined in 3GPP TS 38.473. F1AP consists of so-called "elementary procedures" (EPs). An EP is a unit of interaction between gNB-CU and gNB-DU. These EPs are defined separately and are intended to be used to build up complete messaging sequences in a flexible manner. Generally, unless otherwise stated by the restrictions, the EPs may be invoked independently of each other as standalone procedures, which can be active in parallel.

Within such an architecture 300, a gNB-DU 306 (or ngeNB-DU) is under the control of a single gNB-CU 304. When a gNB-DU is initiated (including power-up), it executes the F1 SETUP procedure (which is generally modeled after the above-referenced S1 SETUP procedures of LTE) to inform the controlling gNB-CU of, inter alia, the number of cells (together with the identity of each particular cell) in the F1 SETUP REQUEST message. The gNB-CU at its discretion may choose to activate some or all cells supported by that gNB-DU, and even alter certain operational parameters relating thereto, indicating these selections/alterations in the F1 SETUP RESPONSE message. The identity of each cell to be activated is also included in F1 SETUP RESPONSE.

As seen from the preceding discussion, as the number of cells supported by a given gNB-DU increases, so does the message size of F1 Setup procedure. Especially when the F1AP (the interface/protocol between the gNB-CU and a gNB-DU which it controls) is deployed over a constrained bandwidth link (such as e.g., DOCSIS link of an MSO providing the backhaul between the gNB-CU and a gNB-DU), significant "strain" is placed on the available bandwidth of that constrained link, including to the possible detriment of other services utilizing the same link.

Furthermore, because a single gNB-CU 304 can be deployed in a centralized location supporting hundreds to even thousands of gNB-DUs, the sheer amount of information (e.g., to configure the numerous F1AP links corresponding to each served gNB-DU 306) transmitted over the respective links can itself result in network "flooding;" for instance, 1,000 DOCSIS-supported links to a common gNB-CU may overwhelm the capacity of the backhaul serving the gNB-CU within the network.

Currently, no viable mechanism for avoiding the foregoing overhead and congestion exists. Accordingly, improved apparatus and methods are needed to, inter alia, enable optimized activation of cells (e.g., those supported by respective gNB-DUs over the F1 interface).

SUMMARY

The present disclosure addresses the foregoing needs by providing, inter alia, methods and apparatus for providing optimized activation of cells, such as for example those supported by a NR/5G gNB-DU and gNB-CU.

In one aspect, a method for providing a wireless network node with efficient configuration messaging is disclosed. In one embodiment, the method includes causing activation of a plurality of wireless cells associated with the network node via a centralized node using a streamlined configuration protocol.

In one variant, the wireless network comprises an NG-RAN, and the network node includes at least one enhanced DU (DUe); when the F1 interface is employed for the DUe with multiple cells, the serving enhanced CUe activates a plurality of cells of the DUe during an F1 SETUP procedure using an aggregation mechanism. In one implementation, the aggregation mechanism comprises a single command, and advantageously obviates having to specify individual ID values for each activated cell, thereby reducing the overhead associated with the message(S). The F1 SETUP procedure in one instance allows the activation of all cells of (under control of) the given DUe without specifically enumerating any of the cells to be activated. The F1 SETUP procedure in another instance allows the activation of all cells of (under control of) the given DUe without specifically providing any IDs (e.g., local or global cell identifiers) of any of the cells to be activated.

In another variant, the CUe can enable a plurality of cells for each of a plurality of DUe's under its control using a reduced number of commands, including in one implementation a single command.

In yet another variant, the CUe can enable a plurality of cells for each of a plurality of DUe's, some under its direct control, and some under control of another CU or CUe, using a reduced number of commands, including in one implementation a single command issued by the CUe.

In another aspect of the disclosure, network apparatus for use within a wireless network is disclosed. In one embodiment, the network apparatus includes a CUe entity, and is configured to at least cause activation of a plurality of cells of one or more constituent DUes. In one variant, the CUe is disposed at a different geographic location than that of each constituent DUe, and the CUe and DUe(s) communicate via an MSO network backhaul.

In an additional aspect of the disclosure, computer readable apparatus is described. In one embodiment, the apparatus includes a storage medium configured to store one or more computer programs, and includes a program memory or HDD or SSD on a computerized device such as a CUe. In one variant, the one or more computer programs are configured to cause generation of a command which, when transmitted by the CUe, causes one or more receiving DUe's to activate a plurality of cells. The command is generated as part of a response to a DUe-to-CUe setup request.

In one implementation, the command is issued only to the recipient DUe. In another implementation, the command is issued to a prescribed subset of the DUe's under control by the CUe. In yet another implementation, the command is issued globally to all DUs of the CUe. In yet a further implementation, the command is issued to one or more DUs within "shared" infrastructure of another gNB.

In a further aspect, a wireless access node is disclosed. In one embodiment, the node comprises a computer program operative to execute on a digital processor apparatus, and configured to, when executed, obtain data from a control entity with which the node is associated, and based on the data, cause activation of a plurality of cells of the node. In one variant, the node is a DUe, and the data is part of a command issued from the DUe's controlling CUe to invoke cell activation according to an F1 SETUP protocol.

In yet another aspect, a system is disclosed. In one embodiment, the system includes (i) a controller entity, (ii) one or more distributed entities in data communication therewith.

In still a further aspect of the disclosure, a method for mitigating network congestion is described. In one embodiment, the method includes identifying one or more portions of a network infrastructure that are experiencing congestion or are likely to experience congestion, and based thereon, causing one or more messages exchanged between controller and distributed wireless access node apparatus to utilize a streamlined protocol to reduce messaging overhead. In one variant, the network infrastructure comprises an MSO network backhaul infrastructure, and the streamlined protocol comprises F1 SETUP REQUEST/RESPONSE messaging between the controller and distributed nodes using one or more aggregated cell activation IE's.

These and other aspects shall become apparent when considered in light of the disclosure provided herein.

BRIEF DESCRIPTION OF THE DRAWINGS

FIG. 1 is a tabular representation of a prior art 3GPP LTE S1 SETUP request message and related parameters.

FIG. 2 is a tabular representation of a prior art 3GPP LTE S1 SETUP response message and related parameters.

FIGS. 6a-6b illustrate various implementations of exemplary cell activation IEs (information elements) and associated protocols useful with the methodology of FIG. 6.

FIGS. 6a-1 and 6a-2 illustrate an exemplary implementation of a global cell identifier IE (information element) format and protocol useful with the methodology of FIG. 6.

FIGS. 6b-1 and 6b-2 illustrate various alternate implementations of cell activation IE types and formats useful with various embodiments of the present disclosure.

Figure 3:
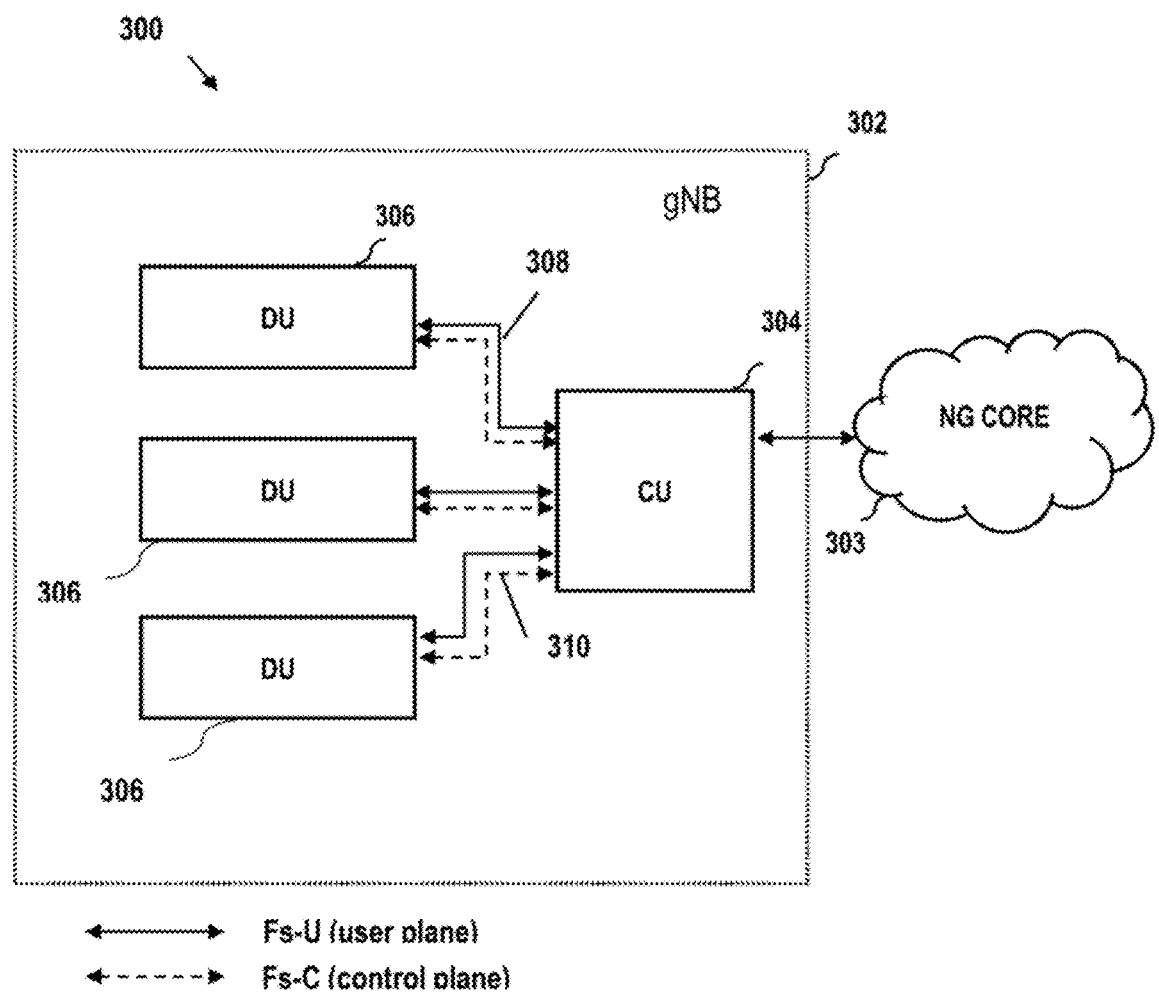
FIG. 3 is a functional block diagram of a prior art gNB architecture including CU and multiple DUs.

All figures © Copyright 2017-2018 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides improved methods and apparatus for providing enhanced wireless services which, inter alia, utilize efficient messaging and cell activation including for very large numbers of cells, and which do not overwhelm data backhaul(s) associated with wireless nodes used for communication.

In one embodiment, a message protocol is used wherein a prescribed number of cells of a given DU (e.g., all, a prescribed subset, etc.) are activated without having to enumerate or include specific data relating to the cells being activated. In one variant, this "global" activation is conducted using an Activate All Cells IE (Information Element) disposed with the F1SETUP RESPONSE message issued by a controlling CU entity within a 5G (NR) infrastructure. Mechanisms for de-activation of all cells are also disclosed.

In other variants, prescribed subsets of the total cell population are activated/de-activated using prescribed IE structures and protocols.

In other variants, cells of multiple DUs can be controlled simultaneously, such as via distribution of a system-wide global activation IE. In still further variants, broadcast or multicast distribution of IE's is provided for, thereby enabling bandwidth-efficient activation/de-activation across larger swaths of CU/DU infrastructure.

Detailed Description of Exemplary Embodiments

Exemplary embodiments of the apparatus and methods of the present disclosure are now described in detail. While these exemplary embodiments are described in the context of the previously mentioned wireless access nodes (e.g., gNBs) associated with or supported at least in part by a managed network of a service provider (e.g., MSO and/or MNO networks), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Distributed gNB Architectures

Figure 4A:
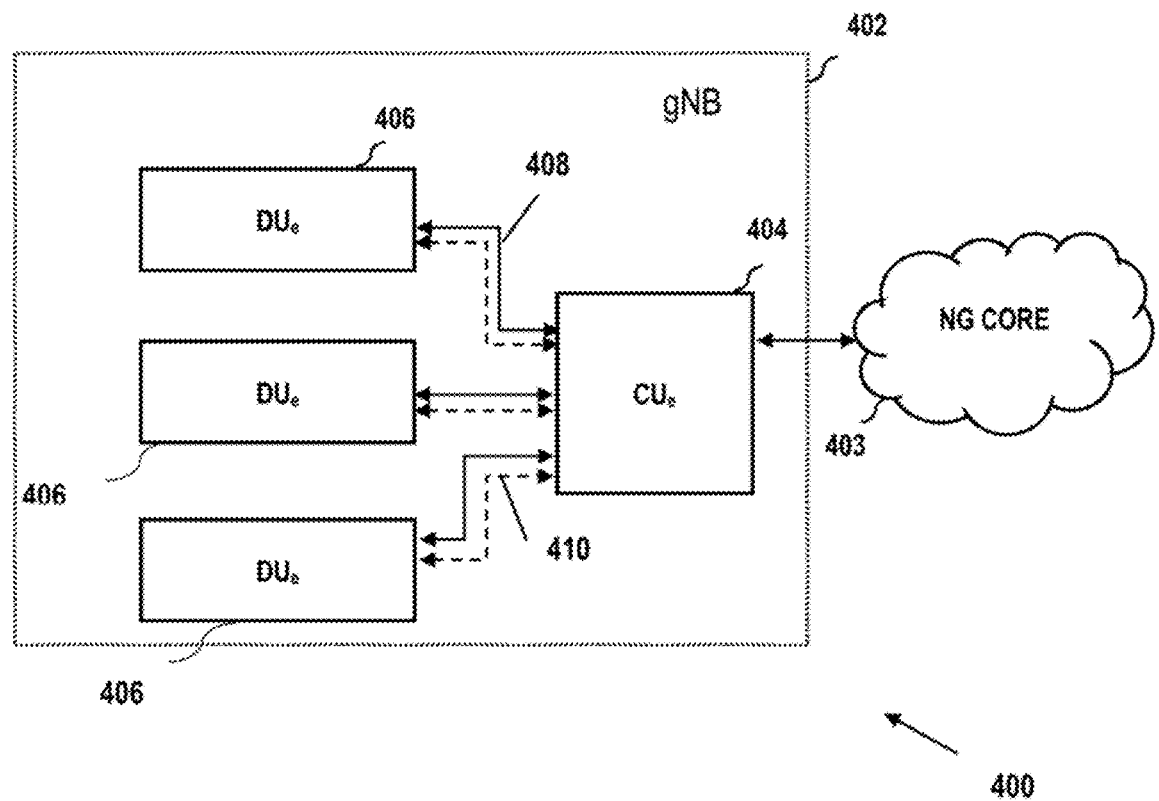
FIG. 4a is a functional block diagram of one exemplary embodiment of a gNB architecture including CU and multiple DUs, according to the present disclosure.
Figure 4B:
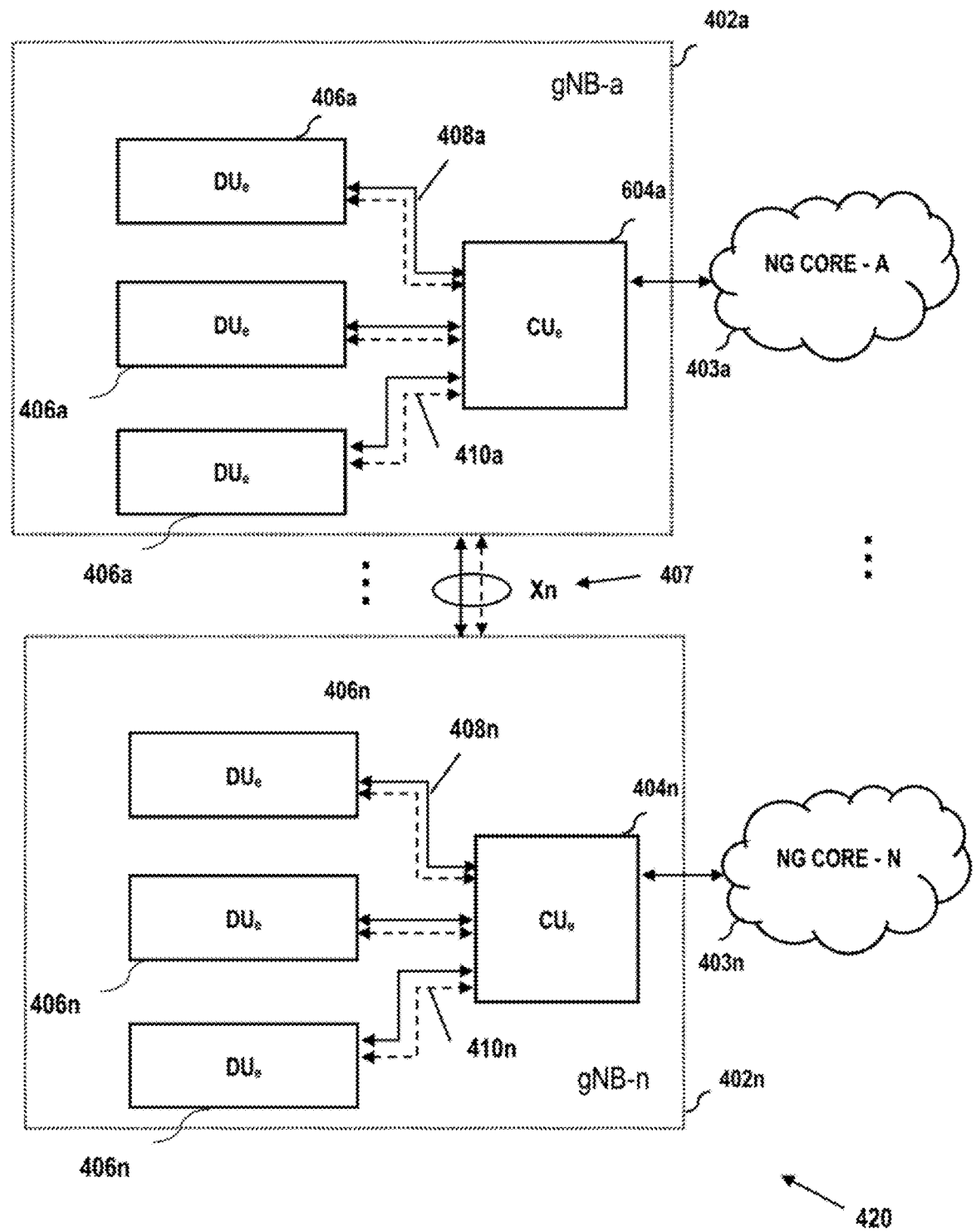
FIG. 4b is a functional block diagram of another exemplary embodiment of a gNB architecture including multiple CUs and multiple corresponding DUs, according to the present disclosure.
Figure 4C:
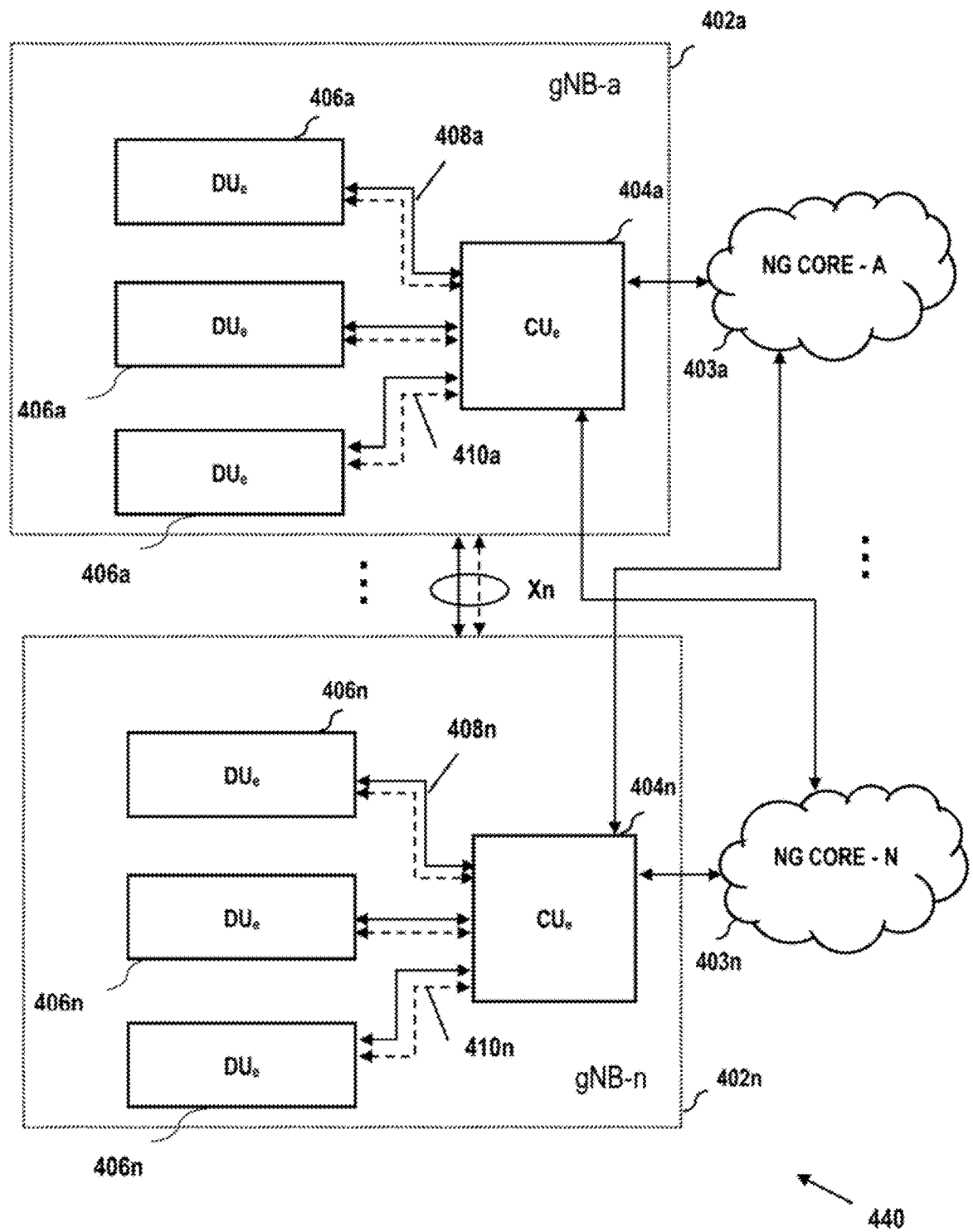
FIG. 4c is a functional block diagram of yet another exemplary embodiment of a gNB architecture including multiple CUs logically cross-connected to multiple different cores, according to the present disclosure.

Referring now to FIGS. 4a-4c, various embodiments of the distributed (CU/DU) gNB architecture according to the present disclosure are described. As shown in FIG. 4a, a first architecture 400 includes a gNB 402 having an enhanced CU (CUe) 404 and a plurality of enhanced DUs (DUe) 406. As described in greater detail subsequently herein, these enhanced entities are enabled to permit efficient inter-process signaling and cell activation, whether autonomously or under control of another logical entity (such as the NG Core 403 with which the gNB communicates, or components thereof).

The individual DUe's 406 in FIG. 4a communicate data and messaging with the CUe 404 via interposed physical communication interfaces 408 and logical interfaces 410. As previously described, such interfaces may include a user plane and control plane, and be embodied in prescribed protocols such as F1AP. Operation of each DUe and CUe are described in greater detail subsequently herein; however, it will be noted that in this embodiment, one CUe 404 is associated with one or more DUe's 406, yet a given DUe is only associated with a single CUe. Likewise, the single CUe 404 is communicative with a single NG Core 403, such as that operated by an MNO or MSO. Each NG Core 403 may have multiple gNBs 402 associated therewith.

In the architecture 420 of FIG. 4b, two or more gNBs 402a-n are communicative with one another via e.g., an Xn interface 407, and accordingly can conduct at least CUe to CUe data transfer and communication. Separate NG Cores 403a-n are used for control and user plane (and other) functions of the network.

In the architecture 440 of FIG. 4c, two or more gNBs 402a-n are communicative with one another via e.g., the Xn interface 407, and accordingly can conduct at least CUe to CUe data transfer and communication. Moreover, the separate NG Cores 403a-n are logically "cross-connected" to the gNBs 402 of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 402 other than its own, and so forth), or the gNBs 402 and NG Cores 403 may form a "mesh" topology where multiple Cores 403 are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MNOs/MSOs, which is especially useful in e.g., dense deployment environments which may not be able to support multiple sets of RAN infrastructure.

It will also be appreciated that while described primarily with respect to a unitary gNB-CU entity or device 404 as shown in FIGS. 4a-4c, the present disclosure is in no way limited to such architectures. For example, the techniques described herein may be implemented as part of a distributed or dis-aggregated or distributed CU entity (e.g., one wherein the user plane and control plane functions of the CU are dis-aggregated or distributed across two or more entities such as a CU-C (control) and CU-U (user)), and/or other functional divisions are employed.

It is also noted that heterogeneous architectures of eNBs or femtocells (i.e., E-UTRAN LTE/LTE-A Node B's or base stations) and gNBs may be utilized consistent with the architectures of FIGS. 4a-4c. For instance, a given DUe may act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

In the 5G NR model, the DU(s) 406 comprise logical nodes that each may include varying subsets of the gNB functions, depending on the functional split option. DU operation is controlled by the CU 404 (and ultimately for some functions by the NG Core 403). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CUe 404 while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s) 406; and (ii) RRC, PDCP in the CUe (with split user plane and control plane stacks), and RLC, MAC, physical layer and RF in the DUe's 406.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CUe 404, while MAC, physical layer, and RF are maintained in the DUe's.

Under Option 5 (Intra-MAC split), RF, physical layer and lower part of the MAC layer (Low-MAC) are in the DUe's 406, while the higher part of the MAC layer (High-MAC), RLC and PDCP are in the CUe 404.

Under Option 6 (MAC-PHY split), the MAC and upper layers are in the CUe, while the PHY layer and RF are in the DUe's 406. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUe's 406, while remaining functions reside in the CUe 404. In the DL, iFFT and CP addition may reside in the DUe 406, while the remainder of the PHY resides in the CUe 404.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

The foregoing split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios. Factors considered in determining how/when to implement such options can include: (i) QoS requirements for offered services (e.g. low latency, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

Service Provider Network—

Figure 5:
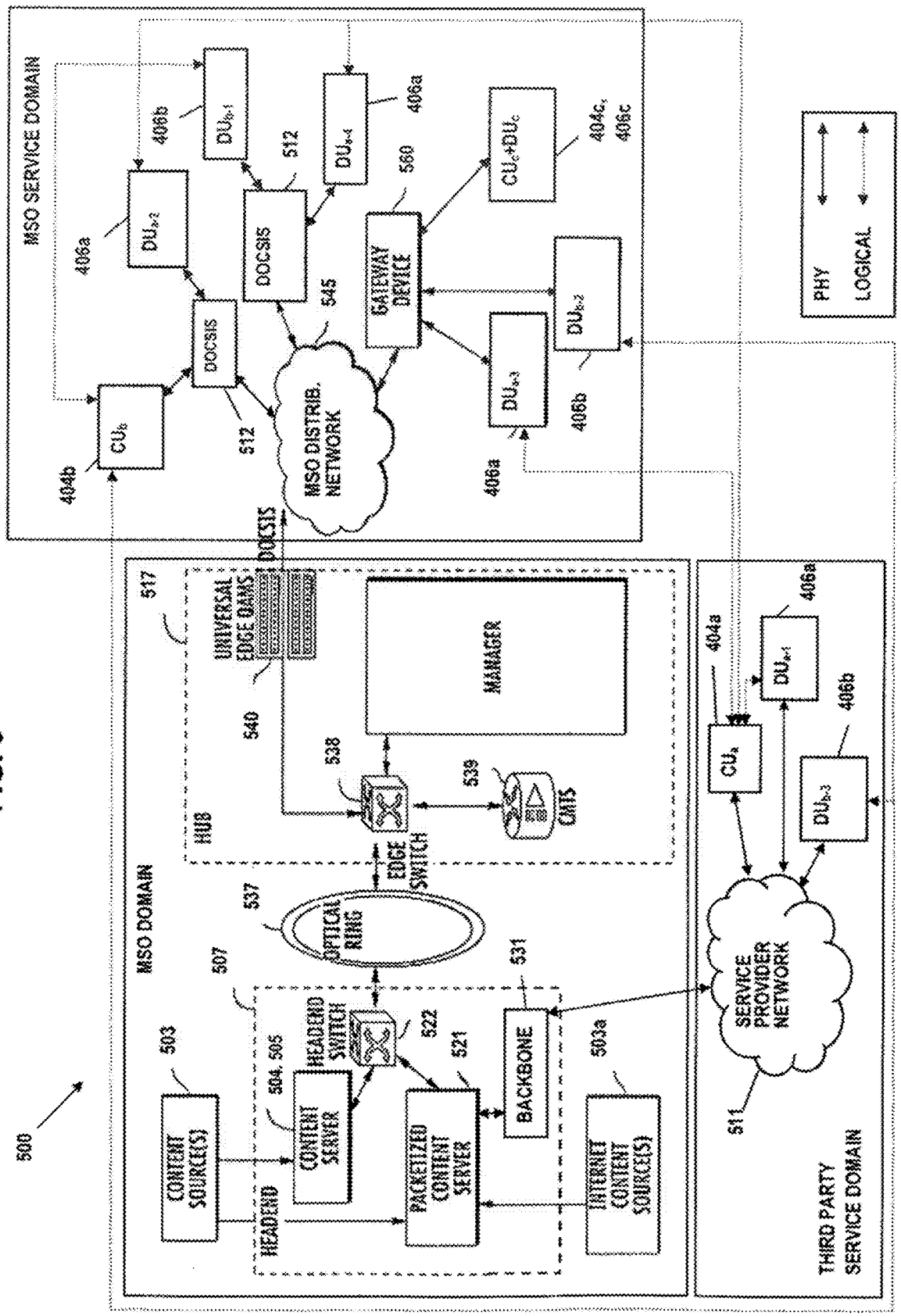
FIG. 5 is a functional block diagram of an exemplary MSO network architecture useful in conjunction with various features described herein.

FIG. 5 illustrates a typical service provider network configuration useful with the features of the enhanced cell activation apparatus and methods described herein. This service provider network 500 is used in one embodiment of the disclosure to provide backbone and backhaul from the service provider's service nodes, such as HFC cable or FTTC/FTTH drops to different premises or venues/residences. For example. one or more stand-alone or embedded DOCSIS cable modems (CMs) 512 are in data communication with the various NR architecture components (e.g., DUe's and CUe's) as described in greater detail below, so as to provide two-way data communication to the served components.

In certain embodiments, the service provider network 500 also advantageously permits the aggregation and/or analysis of subscriber- or account-specific data (including inter alia, particular CUe or DUe or E-UTRAN eNB/femtocell devices associated with such subscriber or accounts) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 507 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising; and (iii) determination of subscription level, and hence subscriber privileges and access to certain services as applicable. Moreover, device profiles for particular devices can be maintained by the MSO, such that the MSO (or its automated proxy processes) can model the device for wireless or other capabilities.

As a brief aside, a number of different identifiers are used in the NG-RAN architecture, including those of UE's and for other network entities. Specifically:

the AMF Identifier (AMF ID) is used to identify an AMF (Access and Mobility Management Function);

the NR Cell Global Identifier (NCGI), is used to identify NR cells globally, and is constructed from the PLMN identity to which the cell belongs, and the NR Cell Identity (NCI) of the cell;

the gNB Identifier (gNB ID) is used to identify gNBs within a PLMN, and is contained within the NCI of its cells;

the Global gNB ID, which is used to identify gNBs globally, and is constructed from the PLMN identity to which the gNB belongs, and the gNB ID;

the Tracking Area identity (TAI), which is used to identify tracking areas, and is constructed from the PLMN identity to which the tracking area belongs, and the TAC (Tracking Area Code) of the Tracking Area; and the Single Network Slice Selection Assistance information (S-NSSAI), which is used to identify a network slice.

Hence, depending on what data is useful to the MSO or its customers, various portions of the foregoing can be associated and stored to particular gNB "clients" or their components being backhauled by the MSO network.

The MSO network architecture 500 of FIG. 5 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 5 may deliver Internet data and OTT (over-the-top) services to the end users (including those of the DUe's 406a-c) via the Internet protocol (IP) and TCP (i.e., over the 5G radio bearer), although other protocols and transport mechanisms of the type well known in the digital communication art may be substituted.

The network architecture 500 of FIG. 5 generally includes one or more headends 507 in communication with at least one hub 517 via an optical ring 537. The distribution hub 517 is able to provide content to various "client" devices 404a-c, 406a-c, and gateway devices 560 as applicable, via an interposed network infrastructure 545. It will be appreciated from examination of FIG. 5 that the various gNB components (including DUe's and CUe's) may each act as a "client" device of the network. For example, in many installations, the CUe 404 of a given gNB is physically disparate or removed from the locations of its constituent DUe's 406, and hence an interposed (e.g., wired, wireless, optical) PHY bearer is needed to communicate data between the DUe's and CUe of a given gNB. In one such architecture, the CUe may be placed further toward the core of the MSO distribution network, while the various constituent DUe's are placed at the edge. Alternatively, both devices may be near the edge (and e.g., served by edge QAMs or RF carriers 540 as shown in FIG. 5). In both cases, the MSO infrastructure may be used to "backhaul" data from each device and communicate it to, via the MSO infrastructure, the other components, much as two geographically disparate customers of a given MSO might communicate data via their respective DOCSIS modems in their premises. Each component has an IP address within the network, and as such can be accessed (subject to the limitations of the architecture used as described above with respect to FIGS. 4a-4c) by the other components.

Alternatively, the CUe's (which in effect aggregate the traffic from the various constituent DUe's towards the NG Core 403), may have a dedicated high bandwidth "drop".

Moreover, a given CU and DU may be co-located as desired, as shown by the combined units 404c, 406c in FIG. 5. This may also be "hybridized," such as where one constituent DUe is co-located (and potentially physically integrated) with the CU, while the remaining DUe of that CUe are geographically and physically distributed.

In the MSO network 500 of FIG. 5, various content sources 503, 503a are used to provide content to content servers 504, 505 and origin servers 521. For example, content may be received from a local, regional, or network content library as discussed in co-owned U.S. Pat. No. 8,997,136 entitled "APPARATUS AND METHODS FOR PACKETIZED CONTENT DELIVERY OVER A BAND- WIDTH-EFFICIENT NETWORK", which is incorporated herein by reference in its entirety. Alternatively, content may be received from linear analog or digital feeds, as well as third party content sources. Internet content sources 503*a* (such as e.g., a web server) provide Internet content to a packetized content origin server(s) 521. Other IP content may also be received at the origin server(s) 521, such as voice over IP (VoIP) and/or IPTV content. Content may also be received from subscriber and non-subscriber devices (e.g., a PC or smartphone-originated user made video).

The network architecture 500 of FIG. 5 may further include a legacy multiplexer/encrypter/modulator (MEM; not shown). In the present context, the content server 504 and packetized content server 521 may be coupled via a LAN to a headend switching device 522 such as an 802.3z Gigabit Ethernet (or "10G") device. For downstream delivery via the MSO infrastructure (i.e., QAMs), video and audio content is multiplexed at the headend 507 and transmitted to the edge switch device 538 (which may also comprise an 802.3z Gigabit Ethernet device) via the optical ring 537.

In one exemplary content delivery paradigm, MPEG-based video content (e.g., MPEG-2, H.264/AVC) may be delivered to user IP-based client devices over the relevant physical transport (e.g., DOCSIS channels and 5G NR bearer of the respective DUe 406); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). Delivery in such packetized modes may be unicast, multicast, or broadcast.

Individual devices such as cable modems 512 and associated gNB devices 404, 406 of the implementation of FIG. 5 may be configured to monitor the particular assigned RF channel (such as via a port or socket ID/address, or other such mechanism) for IP packets intended for the gNB/subscriber premises/address that they serve. The IP packets associated with Internet services are received by edge switch, and forwarded to the cable modem termination system (CMTS) 539. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the "client" gNB devices. The IP packets are typically transmitted on RF channels that are different than the "in band" RF channels used for the broadcast video and audio programming, although this is not a requirement.

In one implementation, the CMs 512 shown in FIG. 5 each service a premises or venue, such as a conference center or hospitality structure (e.g., hotel), which includes one or more DUe nodes for provision of 5G NR services, and may also service WLAN (e.g., 802.11-2016 compliant Wi-Fi) nodes for WLAN access (e.g., within 2.4 GHz ISM band), or even E-UTRAN femtocells, CBRS (Citizens Broadband Radio Service) nodes, or other such devices.

In parallel with (or in place of) the foregoing delivery mechanisms, the MSO backbone 531 and other network components can be used to deliver packetized content to the "client" gNB devices 404, 406 via non-MSO networks. For example, so-called "OTT" content (whether tightly coupled or otherwise) can be ingested, stored within the MSO's network infrastructure, and delivered to the gNB CUe 404 via an interposed service provider network (which may include a public Internet) 511 (e.g., at a local coffee shop, via a DUe connected to the coffee shop's service provider via a modem, with the user's IP-enabled end-user device utilizing an Internet browser or MSO/third-party app to stream content according to an HTTP-based approach over the MSO backbone 531 to the third party network to the service provider modem (or optical demodulator) to the DUe, and to the user device via the DUe NR wireless interface.

It will further be recognized that user-plane data/traffic may also be routed and delivered apart from the CUe. In one implementation (described above), the CUe hosts both the RRC (control-plane) and PDCP (user-plane); however, as but one alternate embodiment, a so-called "dis-aggregated" CUe may be utilized, wherein a CUe-CP entity (i.e., CUe—control plane) hosts only the RRC related functions, and a CUe-UP (CUe—user plane) which is configured to host only PDCP/SDAP (user-plane) functions. The CUe-CP and CUe-UP entities can, in one variant, interface data and inter-process communications via an E1 data interface, although other approaches for communication may be used. It will also be appreciated that the CUe-CP and CUe-UP may be controlled and/or operated by different entities, such as where one service provider or network operator maintains cognizance/control over the CUe-UP, and another over the CUe-CP, and the operations of the two coordinated according to one or more prescribed operational or service policies or rules.

In certain embodiments, each DUe 406 is located within and/or services one or more areas within one or more venues or residences (e.g., a building, room, or plaza for commercial, corporate, academic purposes, and/or any other space suitable for wireless access). Each DUe is configured to provide wireless network coverage within its coverage or connectivity range for its RAT (e.g., 5G NR). For example, a venue may have a wireless NR modem (DUe) installed within the entrance thereof for prospective customers to connect to, including those in the parking lot via inter alia, their NR or LTE-enabled vehicles or personal devices of operators thereof. Notably, different classes of DUe 406 may be utilized. For instance, by analogy, Class A LTE eNBs used in CBRS applications can transmit up 30 dbm (1 watt), while Class-B LTE eNBs can transmit up to 50 dbm, so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc. Similarly, different types of NR-enabled DUe 406 can be used depending on these factors, whether alone or with other wireless PHYs such as LTE, WLAN, etc.

Methodology

Figure 6:
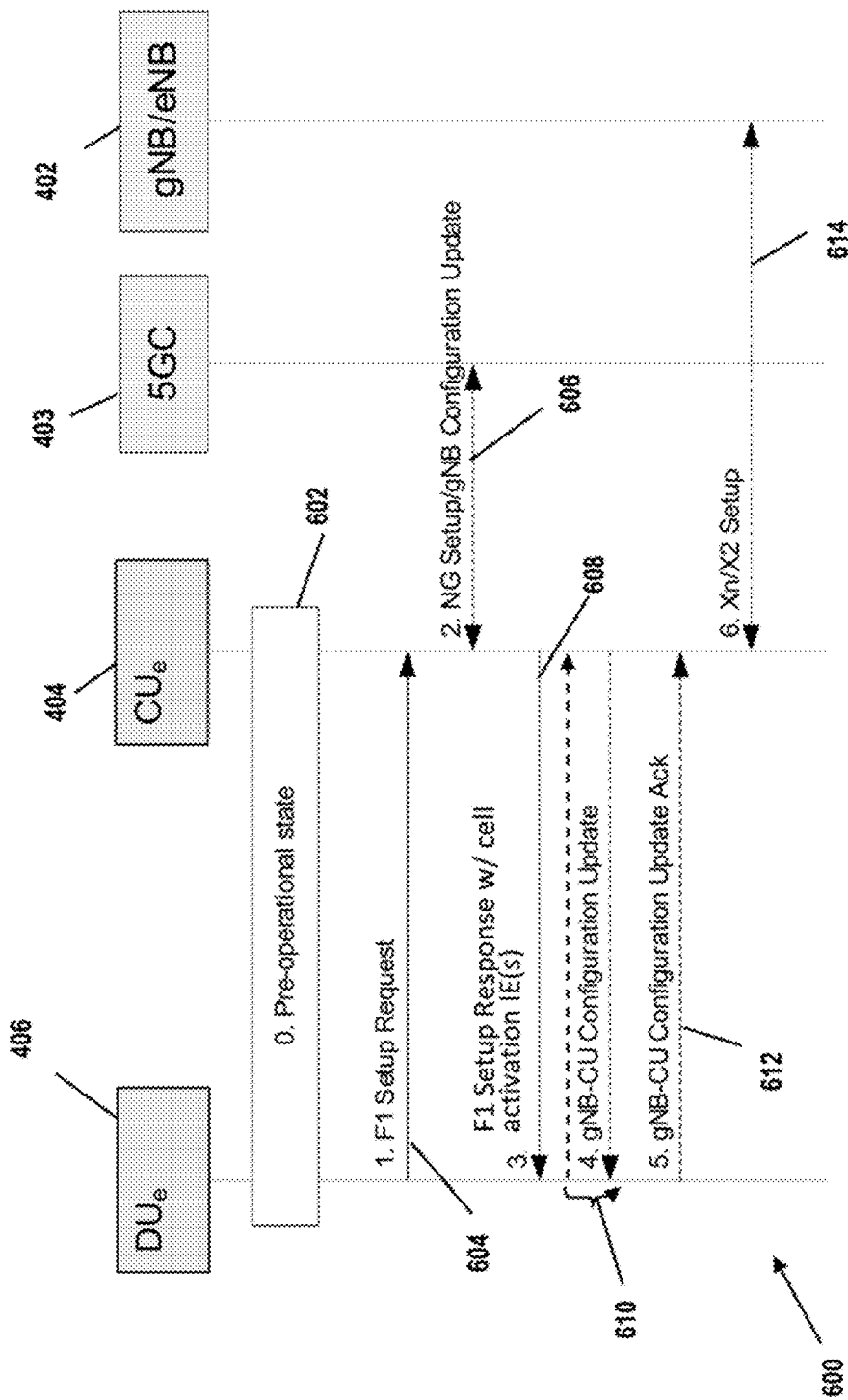
FIG. 6 is a ladder diagram illustrating an exemplary embodiment of an F1 startup and cell activation message flow according to the present disclosure.
Figure 7:
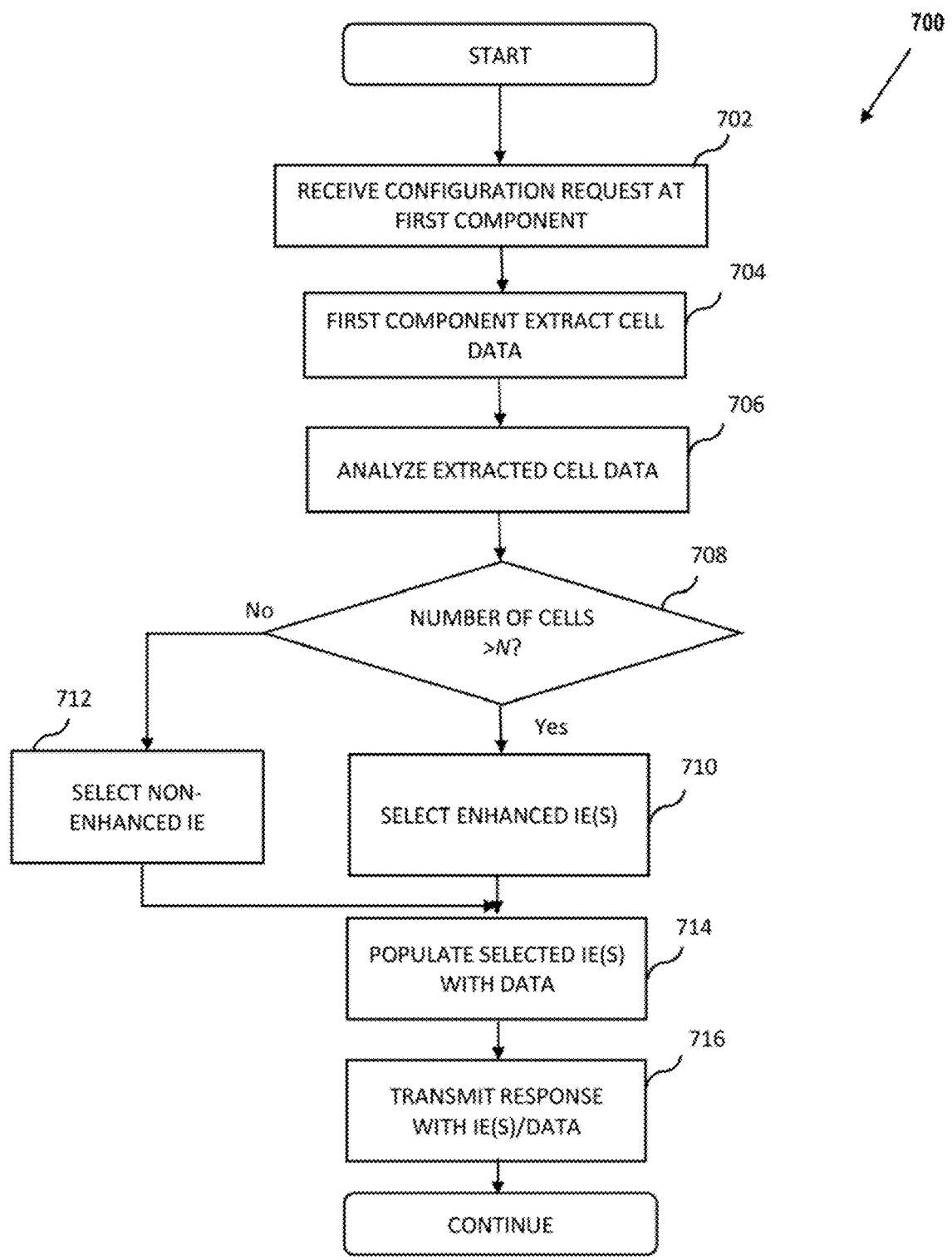
FIG. 7 is logical flow diagram of an exemplary method for cell activation (or de-activation) according to the present disclosure.

Referring now to FIGS. 6-7, one embodiment of startup and cell activation methodology of the present disclosure is now described in detail. This methodology is described in the exemplary context of the NGR F1 SETUP procedure referenced above, although it will be appreciated that it may be adapted to other procedures and applications by those of ordinary skill given the present disclosure.

Specifically, the illustrated methodology allows the setup of the F1 interface between a DUe and a CUe, including activation of the desired DUe cells. The purpose of the F1 SETUP procedure is to exchange application level data needed for the DUe and the CUe to interoperate via the F1 interface, and is the first F1AP procedure triggered after the TNL association has become operational. The F1 Setup procedure uses non-UE associated signalling.

At step 602 of the methodology 600 of FIG. 6, the DUe and its cells are configured by OAM in the F1 pre-operational state. The DUe has TNL connectivity toward the CUe.

Figure 6A:
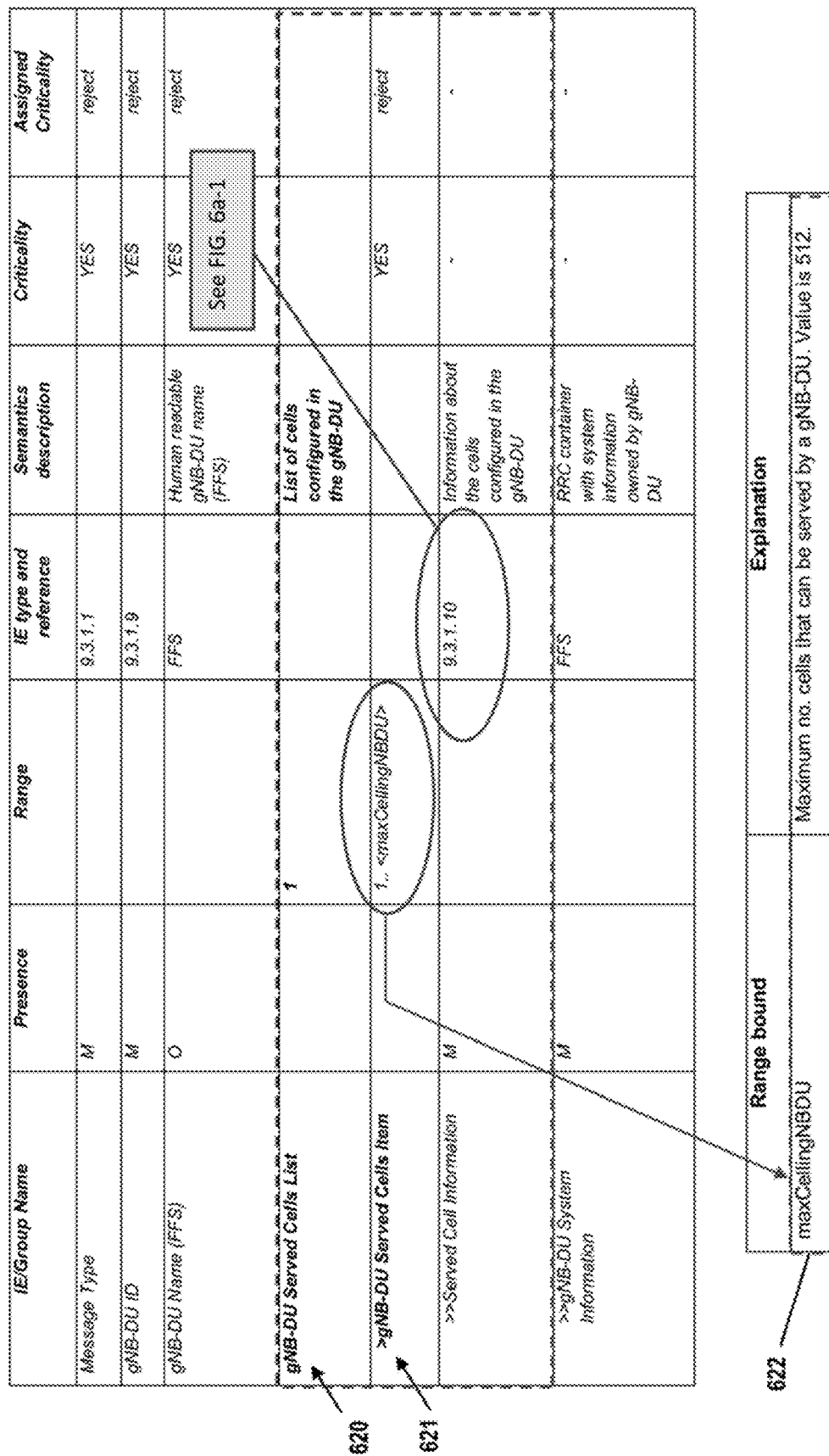

At step 604, the DUe 406 sends an F1 SETUP REQUEST message to the CUe, including a list of cells that are configured and ready to be activated. As shown in FIG. 6a, this may be embodied in the form of a gNB-DU Served Cells List IE 620 and gNB-DU Served Cells Item IE 621, which lists or enumerates the cells of the requesting DUe that have been configured, up to the <maxCellingNBDU>622 value limit of e.g., 512 (although other values may be used consistent with the present disclosure).

In one particular implementation, a "global" cell identification mechanism is used for identification of individual cells. For instance, in one variant, a CGI (Cell Global Identifier) 624 of the type shown in FIG. 6a-1 is utilized, which includes a Cell Identity (CI) IE 626 (see FIG. 6a-2), which is comprised of a multi-bit string of a prescribed length (here, 36 bits, although more or less bits, and/or other IE structures may be utilized consistent with the present disclosure, such as the PCI or physical cell ID).

Returning again to the method 600 of FIG. 6, in the NG-RAN model, the CU ensures the connectivity toward the core network 403. For this reason, the CUe 404 may initiate NG Setup or gNB Configuration Update procedures towards the 5GC 403 as shown in step 606.

Next, per step 608, the CUe 404 sends an F1 SETUP RESPONSE message to the requesting DUe 406 that optionally includes a "list" of cells to be activated. As described in greater detail below, this list may be implemented in any number of forms, including an IE (information element) which in one embodiment comprises an "Activate All Cells" IE included in the F1 SETUP RESPONSE message. The Activate All Cells IE may take on any number of different forms, depending on CUe and DUe configuration. For example, in one variant (FIG. 6b), the Activate All Cells IE activates all cells listed in the F1 SETUP REQUEST message from the DUe. This is in contrast to the prior art approach, wherein a DU activates all the cells that are included in F1 SETUP REQUEST (and only those) via the Cells to be Activated List IE which includes a list of cells that the CU requests the DU to activate.

If the DUe 406 succeeds in activating the cell(s) of the "list," then these cells become operational. If the DUe fails to activate some cell(s), the DUe may initiate a DUe Configuration Update procedure towards the CUe per step 608; in response, the CUe 404 may send a CU Configuration Update message to the DUe that optionally includes a "list" of cells to activated (which may include the Activate All Cells IE)—e.g., in case that these cells were not activated using the F1 SETUP RESPONSE message of step 608.

Per step 612, the DUe 406 replies with a DUe Configuration Update Acknowledge message, that optionally may also include a list of cells that failed to be activated.

Per step 614, the CUe 404 may initiate Xn Setup or X2 Setup procedures towards one or more neighbor gNBs 402 or eNBs, respectively.

It is further noted that in the case where the F1 SETUP RESPONSE is not used to activate any cell (e.g., where the CUe sends an F1 SETUP RESPONSE to the DUe 406 with no list), step 606 can be performed after step 608.

It is also noted that a "de-activation" function may be implemented consistent with the present disclosure, such as de-active all or a prescribed subset of cells (analogous to the previously described activation messages and protocols). In one implementation, the CUe is configured to send a message (i.e., GNB-CU CONFIGURATION UPDATE) including a list or range of cells which the CUe wishes a particular DU (or set of DUs, in the case of a multicast/broadcast) to de-activate, as described below in greater detail with respect to FIG. 6c.

In one embodiment, the Activate All Cells IE 630 (FIG. 6b) is configured to have two values; i.e., 0 (meaning do not activate "all" cells), and 1 (meaning activate "all" cells). Note that depending on implementation, the definition of "all cells" that are to be activated may be varied. For instance, in one variant, the "all cells" is defined as "all cells included in the F1 SETUP REQUEST received from the DUe" (see FIG. 6b and discussion above relating thereto). Hence, in this case, the CUe will only mirror what cells are listed as "configured" by the DUe in the F1 SETUP REQUEST message.

Alternatively, in other variants (see FIGS. 6b-1 and 6b-2), the "all cells" of the IE may be a prescribed number or range of cells (e.g., "C1-C512" or $C_n$, where $n=2^i$ to $2^j$), irrespective of whether they have been listed by the DU or not. Multiple ranges of cells may be specified such as through the use of a tiered IE system. For example, in one such approach, multiple Activate All Cells ($IE_n$) IEs 640 may be defined, each one pertaining to a prescribed range (e.g., $IE_{n=1}$ for cells 0-1024, $IE_{n=5}$ for cells greater than a variable/prescribed value, and so forth); see FIG. 6b-1. In another variant (FIG. 6b-2), an "unconditional" activation 650 may be imposed by the CUe. Yet other approaches to specifying the definition of "all cells" will be recognized by those of ordinary skill given the present disclosure, the foregoing being merely exemplary species of the broader genus.

It will also be appreciated that the distributed/split architectures 400, 420, 440 may be configured to utilize more global message and IE approaches, thereby enabling common or concurrent activation/de-activation of (i) multiple DUs served by a common CU, or (ii) multiple DUs served by two or more CUs. For example, a CU may be instructed by its parent NGC 403 (or another NGC, such as in FIG. 4c) to activate all cells for all DUs which it controls. Likewise, a CU may activate all cells of its constituent DUs, as well as those of another CU with which it interfaces (i.e., via the Xn interface 407).

It will be recognized that under some prevailing implementations, it is the DU which initiates F1 SETUP procedure. Until such initiation, the corresponding CU has no knowledge of the DU's transport link (e.g., IP address). However, according to one embodiment of the present disclosure, the foregoing limitation is overcome by utilizing the OA&M (operation, administration and management)/EMS (element management system) systems of the associated network to provision and update a given DUe's transport link information. As such, after the provisioning/update, a cognizant CUe can implement a protocol (e.g., send a message e.g. F1-SETUP-UNSOLICITED or the like) to instruct all of the DUe's it has configured to "activate all cells" (or otherwise invoke activation of a selected subset as described elsewhere herein). In one approach, the DUe's receiving such a message then use a default configuration which may be prestored on the DUe to activate the cells it has configured, indicated in for example the "Activate All Cells" IE.

In another embodiment, the enhanced IE(s) (e.g., Activate All Cells) may be modified to include one or more appended or additional data elements, such as for example where a physical cell identifier (PCI) requires change for e.g., de-confliction purposes. In one implementation, the "Activate All Cells" IE includes cell-identifiers of cell(s) the CUe wishes the DUe to modify (from its default configuration), along with listing all the parameters it wishes for the DUe to modify (e.g. PCI in the exemplary case), and process begins by activation of the cell(s) indicated via "Activate All Cells" IE on a "one-by-one" basis. For instance, in one implementation, a current cell in the list which the DU is working on activating (denoted as current cell to activate) is first evaluated; if the cell-identifier of the current cell to activate matches the cell identifier of one of the IEs included in "Activate All Cells" IE, then the DUe (or its proxy) checks the list of modified attributes/parameters; these modified parameters are then utilized in the activation procedure. The foregoing approach is then repeated until compliance with the "Activate All Cells" IE is achieved; i.e., all cells listed in the IE are processed/dispositioned.

In yet other embodiments, the Activate All Cells IE(s) referenced above can be broadcast or multicast to two or more DUe's under control of a given CUe, thereby obviating separate (unique) response messaging to each DUe, and hence further reducing overhead (and congestion within e.g., the MSO backhaul or other communication channels). For instance, a multicast IP address format may be utilized (subject to the CUe knowing the DUe transport(s), as previously discussed) to issue the command to two or more DUe's; this may also be made contingent upon receipt of request messaging (e.g., F1 SETUP REQUEST messages) from the constituent DUe's (e.g., where two DUe's simultaneously or nearly-simultaneously request setup per the F1AP, they can be contemporaneously activated using the enhanced IE's).

Figure 6C:
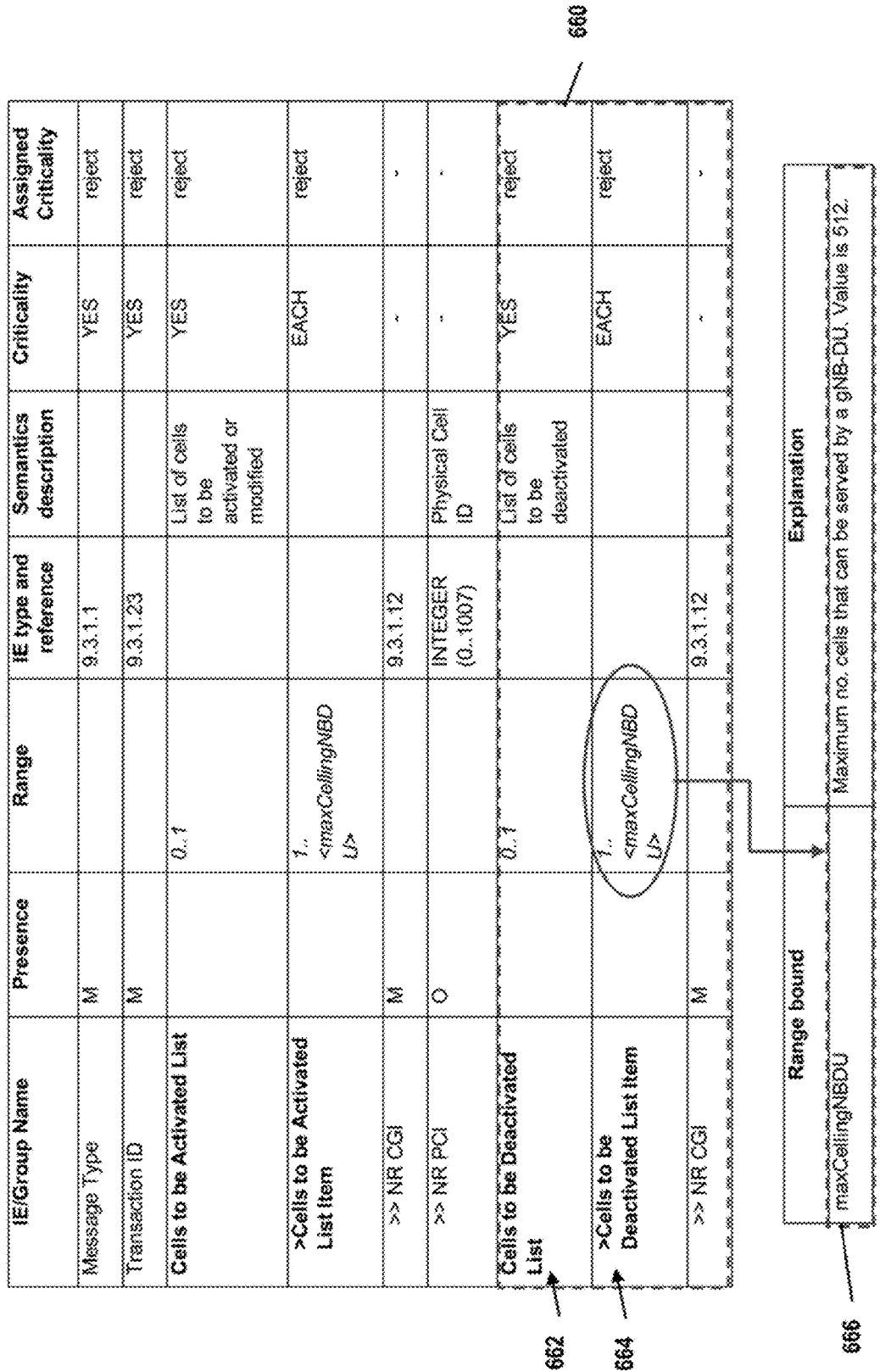
FIG. 6c illustrates one implementation of exemplary cell de-activation IEs and associated protocols according to the present disclosure.

Referring now to FIG. 6c, one exemplary embodiment of a cell de-activation protocol (including IE's) according to the present disclosure is shown and described. In this embodiment, a GNB-CU CONFIGURATION UPDATE message is generated and sent by the CUe to one or more DUe's transfer updated information for a TNL association. As shown, the relevant IE's of the message include a "Cells to be Deactivated List" 662, configured as a "binary" or on/off value (0, 1), with cells to be deactivated specifically listed in the "Cells to be Deactivated List Item" 664 up to the <maxCellingNBDU> value 666 limit of e.g., 512 (although other values may be used consistent with the present disclosure). Also note that in the illustrated embodiment, the "global" cell identification mechanism described supra with regard to cell activation embodiments is used for identification of individual cells. For instance, in one variant, a CGI (Cell Global Identifier) of the type shown in FIG. 6c is utilized, which includes a Cell Identity (CI) IE (see FIG. 6a-2), which is comprised of a multi-bit string of a prescribed length (here, 36 bits, although more or less bits, and/or other IE structures may be utilized consistent with the present disclosure).

Referring now to FIG. 7, one embodiment of a generalized methodology for efficient cell activation within a wireless network is disclosed. It will be appreciated that while described generally with respect to cell activation, the methodology of FIG. 7 may also be readily adapted by those of ordinary skill given the present disclosure to implement efficient cell de-activation for one or more DUe, consistent with the foregoing disclosure.

As shown in FIG. 7, the methodology 700 comprises first receiving a configuration request message at a first component of a distributed entity architecture at step 702. In one exemplary implementation, the request message comprises an F1 SETUP REQUEST issued by the DUe 406 and transmitted via the interface 408, 410 of the gNB architecture of FIG. 4a to the CUe 404, and includes a Served Cells list of cells of the DUe.

Figure 9:
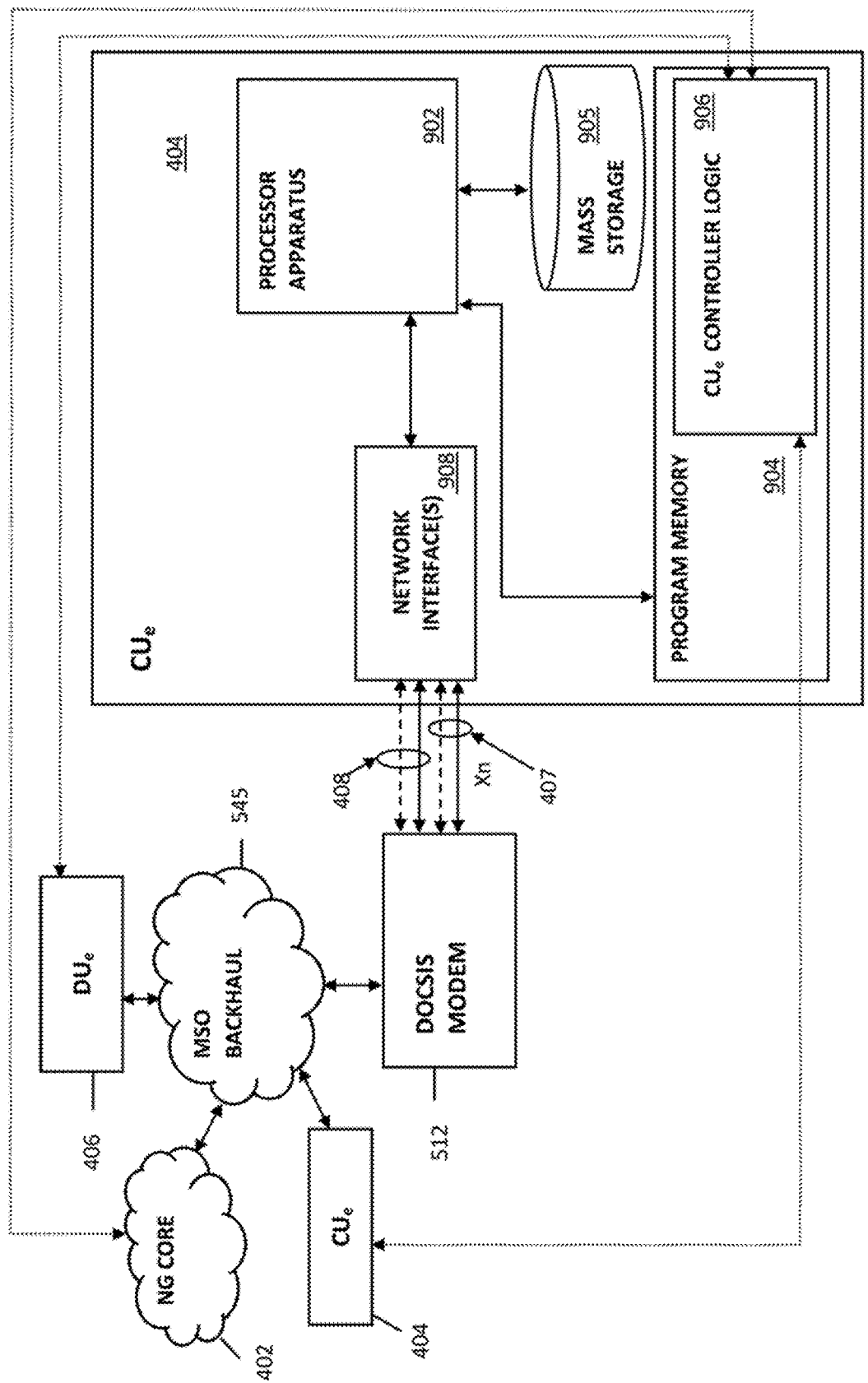
FIG. 9 is a functional block diagram illustrating a first exemplary embodiment of an enhanced central(ized) unit (CUe) apparatus useful with various embodiments of the present disclosure.

Next, per steps 704 and 706, the receiving component (e.g., CUe 404) evaluates the IE(s) of the request message by extracting the data therefrom, and analyzing it via computerized logic within the CUe (see FIG. 9). In one embodiment, this analysis includes first determining whether the number of individual cells served by a given DUe 406 exceeds a prescribed threshold (e.g., greater than N). This can be accomplished by, for example, consulting a database maintained by or accessible to the CUe, or receiving such data in another message issued from e.g., an NG Core entity or controller. If N is exceeded (step 708), then one or more of the enhanced IE(s) (e.g., Activate All Cells, Activate All Cells-n, etc.) is selected for use by the CUe logic per step 710.

If N is not exceeded per step 708, then the "list" approach of the prior art described above may be used (e.g., Cells to be Activated List IE) wherein cells are individually enumerated (step 712).

Once the relevant IE(s) have/has been selected, it/they are populated with the appropriate data per step 714, and the response containing the populated IE(s) transmitted to the requesting entity per step 716.

In one embodiment, the threshold "N" may be dynamically determined by the CUe, the NGC 403, or yet another entity (such as a peer communicative CUe as in FIG. 4b-4c), or an MSO controller process. For example, in one variant, the various threshold (N) values for each DUe within an MSO domain (e.g., backhauled by MSO infrastructure) are individually determined by an MSO network computerized controller process, which obtains loading data for various portions of MSO network (backhaul) infrastructure, and conducts algorithmic analysis thereof to map the various portions of the MSO service topology which are experiencing significant loading or "bottlenecking" (e.g., generally akin to a highway traffic map indicating portions of roadways experiencing reduced speeds/congestion). If say a certain portion, service group, or topological region of the MSO distribution network is experiencing very high levels of DOCSIS bandwidth demand (upstream and/or downstream, as relevant), then the controller might instruct all or a subset of affected CUes (i.e., those either: (i) served by the affected MSO infrastructure, or (ii) having DUs over which they are cognizant, that are served by the affected infrastructure—see FIG. 5) to reduce their corresponding value of N, so that (i) fewer F1 SETUP REQUEST/RESPONSE message exchanges occur over those affected portions of the infrastructure, and (ii) the exchanges which do occur utilize less bandwidth due to obviating the need for specific enumeration/description data for each cell.

These thresholds may also be programmatically implemented (e.g., implemented according to a prescribed schedule and/or geographic/topological region) or predictive/speculative in nature, such as based on prior (historical) demand data as a function of date, time, or other parameter. In the case of such predictive or speculative thresholds, the CUe (or its proxy entity) may also schedule the cell activation based on the prediction. For instance, if the predicted load on a portion of the infrastructure of concern (e.g., the backhaul between one or more DUe's and the relevant CUe) is predicted to increase or decline significantly over a current value at a prescribed future point in time, the use of the reduced-overhead protocols described herein can be selectively applied (or not applied, including "partial" application such as to only certain DUe of a given CUe, and/or reductions or increases in the threshold value of N) to coincide with that future point in time, subject to any then-prevailing service requirements such as allowable latency for cell activation or the like. As but one example, the CUe may wait until other pending activation transactions "clear" the system before implementing cell activation to one or more of its controlled DUe. Moreover, it will be appreciated that the CUe can notify or instruct the relevant DUe as to any schedule changes or delays; e.g., such as via an IE in the setup response message, whereby the DUe can postpone or delay activation based on the received IE.

Such analyses may also be conducted relative to or in consideration of other CUe/DUe entities served by the MSO. For instance, where say three (3) different CUe's having DUe's backhauled by the MSO using affected infrastructure, these CUe's may be configured to communicate with one another (e.g., via the Xn interface) to coordinate use of cell activation enhanced IEs.

It is further noted that while described herein as being in response to an F1 SETUP REQUEST message, the selection and use of the enhanced IEs may be unsolicited, such as where the CUe desires to forcibly update or reconfigure one or more DUe's (e.g., to activate a large number of cells concurrently).

DUe Apparatus—

Figure 8:
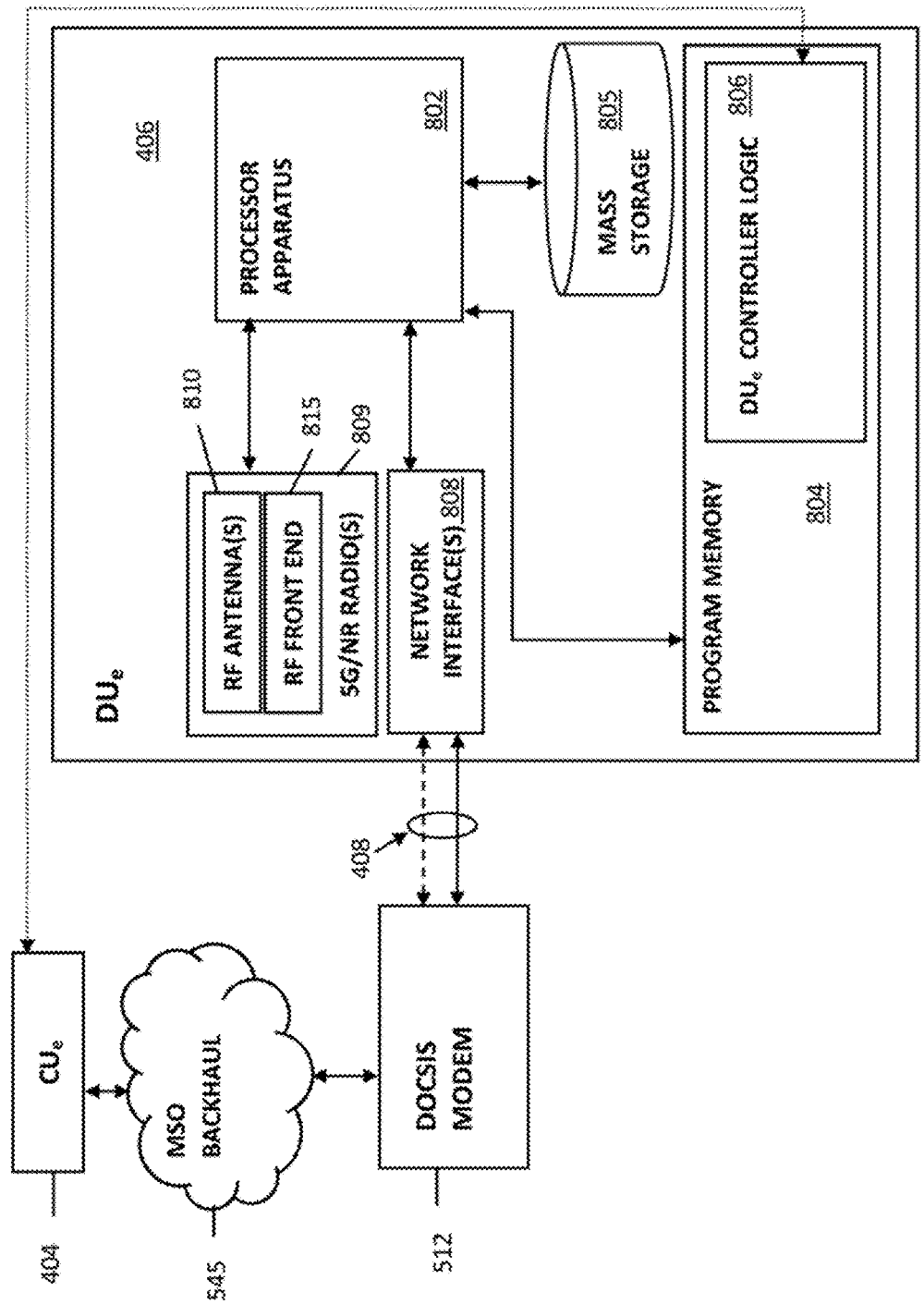
FIG. 8 is a functional block diagram illustrating a first exemplary embodiment of an enhanced distributed unit (DUe) apparatus useful with various embodiments of the present disclosure.

FIG. 8 illustrates an exemplary configuration of an enhanced distributed unit ($DU_e$) 406 according to the present disclosure. As shown, the DUe 406 includes, inter alia, a processor apparatus or subsystem 802, a program memory module 804, mass storage 805, an HTTPS client and location function logic 806, one or more network interfaces 808, and one or more RF (e.g., 5G/New Radio) PHY interfaces 809.

In the exemplary embodiment, the processor 802 may include one or more of a digital signal processor, microprocessor, field-programmable gate array, or plurality of processing components mounted on one or more substrates. The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The RF interface 809 is configured to comply with the relevant PHY standards which it supports (e.g., 5G NR RAN, WLAN such as 802.11-16, and/or others as applicable) in the area/premises/venue being served. The antenna(s) 810 of the DUe NR radio may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

The processing apparatus 802 is configured to execute at least one computer program stored in memory 804 (e.g., a non-transitory computer readable storage medium); in the illustrated embodiment, such programs include DUe controller logic 806, such as whether to select an enhanced F1 SETUP REQUEST message IE or not, receipt and decode of the Activate All Cells or other enhanced IE, and other logical functions performed by the DUe as described elsewhere herein. Other embodiments may implement such functionality within dedicated hardware, logic, and/or specialized co-processors (not shown). The DUe controller logic 806 is a firmware or software module that, inter alia, communicates with a corresponding CUe logic portion (i.e., for message exchange and protocol implementation), and/or other upstream or backend entities such as those within the NG Core 403 in alternate embodiments.

In some embodiments, the DUe logic 806 utilizes memory 804 or other storage 805 configured to temporarily hold a number of data relating to the various IE's (including Cell Lists) before transmission via the network interface(s) 808 to the CUe 404 or NG Core 403. In other embodiments, application program interfaces (APIs) such as those included in an MSO-provided application or those natively available on the DUe may also reside in the internal cache or other memory 804. Such APIs may include common network protocols or programming languages configured to enable communication with the DUe 406 and other network entities (e.g., via API "calls" to the DUe by MSO network processes tasked with gathering load, configuration, or other data). As an aside, a downloadable application or "app" may be available to subscribers of an MSO or cable network (and/or the general public, including MSO "partner" MNO subscribers), where the app allows users to configure their DUe (or CUe as in FIG. 9 herein) to implement enhanced functionality, including data collection and reporting back to the MSO core network so as to enable, inter alia, load determination, congestion, or other attributes which may be useful implementing e.g., the methodology of FIG. 7 discussed above. Application program interfaces (APIs) may be included in an MSO-provided applications, installed with other proprietary software that comes prepackaged with the DUe. Alternatively, the relevant MNO may provide its subscribers with the aforementioned functionality (e.g., as a pre-loaded app on the DUe at distribution, or later via download), or as a firmware update to the DUe stack conducted OTA.

In one implementation, the MSO subscriber or client database may also optionally include the provisioning status of the particular DUe that is associated with an MSO sub scriber.

It will be appreciated that any number of physical configurations of the DUe 406 may be implemented consistent with the present disclosure. As noted above, the functional "split" between DUe's and CUe has many options, including those which may be invoked dynamically (e.g., where the functionality may reside in both one or more DUe's and the corresponding CUe, but is only used in one or the other at a time based on e.g., operational conditions).

CUe Apparatus—

FIG. 9 illustrates a block diagram of an exemplary embodiment of a CUe 404 apparatus, useful for operation in accordance with the present disclosure.

In one exemplary embodiment as shown, the CUe 404 includes, inter alia, a processor apparatus or subsystem 902, a program memory module 904, CUe controller logic 906 (here implemented as software or firmware operative to execute on the processor 902), network interfaces 910 for communications and control data communication with the relevant DUe's 414, and a communication with the NG Core 403 as shown win FIGS. 4a-4c, as well as with other gNBs via the Xn interface 407. In one exemplary embodiment, the CUe's 404 are maintained by the MSO and are each configured to utilize a non-public IP address within an IMS/Private Management Network "DMZ" of the MSO network. As a brief aside, so-called DMZs (demilitarized zones) within a network are physical or logical sub-networks that separate an internal LAN, WAN, PAN, or other such network from other untrusted networks, usually the Internet.

External-facing servers, resources and services are disposed within the DMZ so they are accessible from the Internet, but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via a CUe "spoof" or MITM attack whereby an attacker might attempt to hijack one or more CUe to obtain data from the corresponding DUe's (or even UE's utilizing the DUe's).

Although the exemplary CUe 404 may be used as described within the present disclosure, those of ordinary skill in the related arts will readily appreciate, given the present disclosure, that the "centralized" controller unit 404 may in fact be virtualized and/or distributed within other network or service domain entities (e.g., within one of the DUe of a given gNB 402, within the NG Core 403 or an MSO entity such as a server, a co-located eNB, etc.), and hence the foregoing apparatus 404 of FIG. 9 is purely illustrative.

In one embodiment, the processor apparatus 902 may include one or more of a digital signal processor, microprocessor, field-programmable gate array, or plurality of processing components mounted on one or more substrates. The processor apparatus 902 may also comprise an internal cache memory. The processing subsystem is in communication with a program memory module or subsystem 904, where the latter may include memory which may comprise, e.g., SRAM, flash and/or SDRAM components. The memory module 904 may implement one or more of direct memory access (DMA) type hardware, so as to facilitate data accesses as is well known in the art. The memory module of the exemplary embodiment contains one or more computer-executable instructions that are executable by the processor apparatus 902. A mass storage device (e.g., HDD or SSD, or even NAND flash or the like) is also provided as shown.

The processor apparatus 902 is configured to execute at least one computer program stored in memory 904 (e.g., the logic of the CUe including enhanced IE functionality and cell activation in the form of software or firmware that implements the various functions described herein). Other embodiments may implement such functionality within dedicated hardware, logic, and/or specialized co-processors (not shown).

In one embodiment, the CUe 404 is further configured to register known downstream devices (e.g., access nodes including DUe's 406), other CUe devices), and centrally control the broader gNB functions (and any constituent peer-to-peer sub-networks or meshes). Such configuration include, e.g., providing network identification (e.g., to DUe's, gNBs, client devices such as roaming MNO UEs, and other devices, or to upstream devices such as MNO or MSO NG Core portions 403 and their entities), and managing capabilities supported by the gNB's NR RAN.

The CUe may further be configured to directly or indirectly communicate with one or more authentication, authorization, and accounting (AAA) servers of the network, such as via the interface 908 shown in FIG. 9. The AAA servers, whether locally maintained by the MSO or remotely by e.g., an MNO of the subscriber, are configured to provide services for, e.g., authorization and/or control of network subscribers (including roaming MNO "visitors") for controlling access and enforcing policies, auditing usage, and providing the information necessary to bill for services.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a wireless network having a computerized controller entity and at least one distributed wireless access node, the computerized method comprising:

evaluating a number of wireless cells of the at least one distributed wireless access node with respect to a threshold value; and based on the evaluating indicating that the number meets or exceeds the threshold value, selectively utilizing a modified setup procedure to activate at least the wireless cells of the at least one distributed wireless access node, the modified setup procedure comprising a different activation procedure as compared to a list-based setup procedure, wherein the list-based setup procedure is used based on a number of wireless cells to be activated being less than the threshold value.

2. The computerized method of claim 1, wherein:

the computerized controller entity comprises a NR (New Radio)-compliant centralized unit (CU);

the at least one distributed wireless access node comprises a NR (New Radio)-compliant distributed unit (DU); and the selectively utilizing the modified setup procedure comprises using at least one Information Element (IE) to activate at least the wireless cells of the at least one distributed wireless access node without having to specify particular cell identification (ID) data.

3. The computerized method of claim 2, wherein the selectively utilizing the modified setup procedure to activate at least the wireless cells comprises activating all cells of the NR-compliant DU.

4. The computerized method of claim 2, further comprising receiving a configuration request message from the NR-compliant DU, the configuration request message comprising data relating to at least a portion of the wireless cells of the at least one distributed wireless access node; and wherein the at least one Information Element (IE) is configured to activate or not activate the at least portion of the wireless cells based at least in part on the data.

5. The computerized method of claim 2, wherein the NR-compliant CU comprises: (i) a CU-CP (CU Control plane) entity, and (ii) a CU-UP (CU-User Plane) entity, and the selectively utilizing the modified setup procedure comprises the CU-CP only using the at least one Information Element (IE) to activate the wireless cells of the at least one distributed wireless access node without having to specify the particular cell ID data.

6. The computerized method of claim 2, further comprising using the at least one Information Element (IE) to de-activate one or more of the wireless cells of the at least one distributed wireless access node without having to specify the particular cell ID data.

7. The computerized method of claim 1, wherein the selectively utilizing the modified setup procedure to activate at least the wireless cells comprises causing activation of all of the wireless cells contemporaneously, and the at least one distributed wireless access node is configured to identify all of the wireless cells based only on receipt of a command transmitted from the computerized controller entity, the command not identifying any specific ones of the wireless cells.

8. The computerized method of claim 1, wherein the at least one distributed wireless access node comprises a plurality of wireless access nodes; and the computerized method further comprises causing each of the plurality of wireless access nodes to identify all of the wireless cells of the at least one distributed wireless access node based only on receipt of a command transmitted from the computerized controller entity, the command not identifying any specific cells, the command broadcast to each of the plurality of wireless access nodes contemporaneously.

9. A computerized method of operating a wireless network having at least one computerized controller entity and at least one distributed wireless access node under control thereof, so as to reduce load on one or more network backhaul portions between the at least one computerized controller entity and the at least one distributed wireless access node, the computerized method comprising:
   determining a number of cells to be activated, wherein the cells are associated with the at least one distributed wireless access node;
   evaluating, using at least one computerized process, the number, the evaluating comprising comparing the number to a threshold value;
   based at least in part on said evaluating, causing selection of a non-cell specific communication protocol between the at least one computerized controller entity and the at least one distributed wireless access node; and
   transmitting at least one information element (IE), the at least one IE configured for use in the non-cell specific communication protocol, to the at least one distributed wireless access node to cause activation of the cells associated with the at least one distributed wireless access node.

10. The computerized method of claim 9, wherein:
   the at least one computerized controller entity comprises a NR (New Radio)-compliant centralized unit (CU);
   the at least one distributed wireless access node comprises a plurality of NR (New Radio)-compliant distributed units (DUs); and
   the determining of the number of cells comprises:
      receiving a setup request message from the at least one distributed wireless access node; and
      extracting data relating to the number from the received setup request message.

11. The computerized method of claim 9, wherein at least the evaluating is performed by a computerized process of a network operator entity, the one or more network backhaul portions between the at least one computerized controller entity and the at least one distributed wireless access node operated by the network operator entity, the network operator entity different than an entity which operates: (i) the at least one computerized controller entity, and (ii) the at least one distributed wireless access node.

12. The computerized method of claim 9, wherein the computerized method further comprises:
   dynamically determining the threshold value prior to the comparing, the dynamically determining comprising evaluating data associated with a then-current load of the one or more network backhaul portions.

13. The computerized method of claim 9, wherein the computerized method further comprises:
   dynamically determining the threshold value prior to the comparing, the dynamically determining comprising generating data associated with a projection or prediction of a future level of load of the one or more network backhaul portions;
   utilizing the dynamically determined threshold value as part of the comparing at the then-current time; and
   based at least on the comparing, causing the transmitting of at least the configured IE at a future time consistent with the projection or prediction;
   wherein the projection or prediction is based at least in part on analysis of one or more pending messaging or communications between the at least one computerized controller entity and the at least one distributed wireless access node via the one or more network backhaul portions.

14. The computerized method of claim 9, wherein the causing selection of the non-cell specific communication protocol between the at least one computerized controller entity and the at least one distributed wireless access node comprises causing selection of a protocol which uses an aggregated IE which does not require specific enumeration or identification of each of the cells to be activated.

15. Computer readable apparatus comprising a non-transitory storage medium, the non-transitory storage medium comprising at least one computer program having a plurality of instructions, the plurality of instructions configured to, when executed on a digital processing apparatus:
   determine a plurality of cells to be activated, wherein the plurality of cells are associated with at least one distributed wireless access point;
   cause algorithmic evaluation of the plurality of cells, the algorithmic evaluation comprising utilization of at least one computerized process of at least one computerized controller entity to assess a number of the plurality of cells relative to at least one criterion;
   based at least in part on the algorithmic evaluation, cause selection of a non-cell specific communication protocol between the at least one computerized controller entity and the at least one distributed wireless access point; and
   cause transmission of a response message to the at least one distributed wireless access point, the response message: (i) comprising at least one information element (IE) configured for use in the non-cell specific communication protocol, and (ii) configured to cause activation of the plurality of cells associated with the at least one distributed wireless access point.

16. The computer readable apparatus of claim 15, wherein the plurality of instructions are further configured to, when executed on the digital processing apparatus:
receive messaging, the messaging received according to a prescribed network communication protocol and comprising one or more request messages issued by the at least one distributed wireless access point under at least partial control of the at least one computerized controller entity; and
extract data from the messaging, the extracted data relating to the plurality of cells associated with the at least one distributed wireless access point.

17. The computer readable apparatus of claim 16, wherein the causation of the algorithmic evaluation of the number comprises causation of an algorithmic evaluation of the extracted data to determine that a first computerized protocol for activation of the plurality of cells should be utilized instead of a second, default protocol for activation of the plurality of cells.

18. The computer readable apparatus of claim 17, wherein the plurality of instructions are further configured to, when executed on the digital processing apparatus:
based at least on a result of the algorithmic evaluation, cause utilization of the first computerized protocol to activate the plurality of cells, the activation of the plurality of cells using the first computerized protocol comprising:
identification of a first information element (IE) configured to cause the at least one distributed wireless access point to utilize a prescribed second IE for determining which of the plurality of cells to activate; and
identification of one or more values for the prescribed second IE; and
wherein the response message further comprises at least the first IE and the second IE.

19. The computer readable apparatus of claim 18, wherein:
the one or more request messages comprise one or more NR (New Radio) compliant F1 SETUP REQUEST messages;
the response message comprises a NR compliant F1 SETUP RESPONSE message;
the first and second IE's comprise a binary state value and a numeric range, respectively;
use of the binary state value and the numeric range cooperate to obviate having to list the plurality of cells individually; and
the obviation of having to list the plurality of cells individually comprises obviation of listing the plurality of cells by a unique cell identifier (ID).

20. The computer readable apparatus of claim 15, wherein the at least one criterion comprises a threshold that is dynamically determined based at least on bandwidth demand associated with at least a portion of a content delivery network, such that the threshold is reduced based at least on an increase in the bandwidth demand associated with at least the portion of the content delivery network.

* * * * *